United States Patent

Martin et al.

(10) Patent No.: US 8,291,784 B2
(45) Date of Patent: Oct. 23, 2012

(54) TRANSMISSION LAYOUT

(75) Inventors: William Wesley Martin, Milton Keynes (GB); Richard John Evan Thompson, Langley (GB)

(73) Assignee: Zeroshift Limited, Milton Keynes (GB)

(*) Notice: Subject to any disclaimer, the term of this patent is extended or adjusted under 35 U.S.C. 154(b) by 1092 days.

(21) Appl. No.: 11/914,445

(22) PCT Filed: May 18, 2006

(86) PCT No.: PCT/GB2006/001853
§ 371 (c)(1),
(2), (4) Date: Feb. 27, 2008

(87) PCT Pub. No.: WO2006/123166
PCT Pub. Date: Nov. 23, 2006

(65) Prior Publication Data
US 2009/0255357 A1    Oct. 15, 2009

(30) Foreign Application Priority Data
May 18, 2005   (GB) .................................. 0510129.0

(51) Int. Cl.
*F16H 3/08* (2006.01)
*F16H 59/00* (2006.01)
*F16H 3/22* (2006.01)
(52) U.S. Cl. ................................ 74/329; 74/335; 74/342
(58) Field of Classification Search .............. 74/329, 74/330, 331, 335, 342, 344
See application file for complete search history.

(56) References Cited

U.S. PATENT DOCUMENTS

| | | | |
|---|---|---|---|
| 1,225,144 A | 5/1917 | Land | |
| 2,314,042 A | 3/1943 | Haigh | |
| 2,469,881 A | 5/1949 | Laubach et al. | |
| 3,228,499 A | 1/1966 | Peras | |
| 3,263,781 A | 8/1966 | Simpson | |
| 3,327,822 A | 6/1967 | Spencer | |
| 3,358,800 A | 12/1967 | Clements | |
| 3,406,597 A | 10/1968 | de Brie et al. | |
| 3,680,673 A | 8/1972 | Webb | |
| 3,709,068 A | 1/1973 | Mohri | |
| 3,780,840 A | 12/1973 | Thomas | |

(Continued)

FOREIGN PATENT DOCUMENTS
DE          123398 C         2/1901
(Continued)

OTHER PUBLICATIONS

International Search Report dated Feb. 6, 2007 for PCT Application No. PCT/GB2006/001853, filed May 18, 2006.

(Continued)

*Primary Examiner* — Roger Pang
(74) *Attorney, Agent, or Firm* — Knobbe Martens Olson & Bear LLP

(57) ABSTRACT

A transmission system including first and second shafts (4, 2; 104, 102), a plurality of gear trains arranged to transfer drive between the first and second shafts, an instantaneous selector mechanism (46; 146), and at least one non-instantaneous selector mechanism (40, 44; 140, 144, 153, 157), wherein the instantaneous selector mechanism (46; 146) and the or each non-instantaneous selector mechanism (40, 44; 140, 144, 153, 157) are arranged to create torque paths between the first and second shafts (4, 2; 104, 102) via the gear trains, wherein each gear train is selectable when one other gear train is transmitting torque.

35 Claims, 20 Drawing Sheets

U.S. PATENT DOCUMENTS

| | | | | |
|---|---|---|---|---|
| 3,872,737 | A | 3/1975 | Thomas | |
| 3,903,738 | A | 9/1975 | Malchow | |
| 4,096,932 | A | 6/1978 | Liberty | |
| 4,098,380 | A | 7/1978 | Thomas | |
| 4,241,818 | A | 12/1980 | Miller | |
| 4,274,523 | A | 6/1981 | Sigg | |
| 4,328,719 | A | 5/1982 | Manna | |
| 4,449,416 | A | 5/1984 | Huitema | |
| 4,481,837 | A * | 11/1984 | Stevens | 74/342 |
| 4,485,687 | A * | 12/1984 | Burke et al. | 74/358 |
| 4,519,265 | A | 5/1985 | Dolan et al. | |
| 4,592,241 | A | 6/1986 | Obayashi et al. | |
| 4,674,351 | A | 6/1987 | Byrd et al. | |
| 4,860,607 | A * | 8/1989 | Numazawa et al. | 74/330 |
| 4,920,815 | A | 5/1990 | Reynolds | |
| RE33,336 | E * | 9/1990 | Bainbridge et al. | 74/330 |
| 5,038,633 | A * | 8/1991 | Igarashi et al. | 74/664 |
| 5,181,431 | A | 1/1993 | Zaiser et al. | |
| 5,367,914 | A | 11/1994 | Ordo | |
| 5,592,854 | A | 1/1997 | Alfredsson | |
| 5,679,099 | A | 10/1997 | Kato et al. | |
| 5,685,799 | A | 11/1997 | Vukovich et al. | |
| 5,767,420 | A | 6/1998 | De Schepper et al. | |
| 5,827,148 | A | 10/1998 | Seto et al. | |
| 5,950,781 | A | 9/1999 | Adamis et al. | |
| 6,019,010 | A | 2/2000 | Trinder | |
| 6,061,619 | A | 5/2000 | Schmitz et al. | |
| 6,062,118 | A | 5/2000 | Lee | |
| 6,209,407 | B1 * | 4/2001 | Heinzel et al. | 74/331 |
| 6,251,043 | B1 | 6/2001 | Gierling | |
| 6,296,412 | B1 | 10/2001 | Bakker et al. | |
| 6,505,504 | B1 | 1/2003 | Chang et al. | |
| 6,514,172 | B2 | 2/2003 | Kayano et al. | |
| 6,609,056 | B1 | 8/2003 | Czarnecki et al. | |
| 6,819,997 | B2 | 11/2004 | Buchanan et al. | |
| 6,820,512 | B2 | 11/2004 | Hedman | |
| 6,899,655 | B2 | 5/2005 | Eggert et al. | |
| 6,986,289 | B2 | 1/2006 | Otto et al. | |
| 7,066,043 | B2 * | 6/2006 | Kim et al. | 74/330 |
| 7,261,379 | B2 | 8/2007 | Volker et al. | |
| 7,469,610 | B2 | 12/2008 | Wittkopp | |
| 7,563,200 | B2 | 7/2009 | Martin | |
| 7,563,201 | B2 | 7/2009 | Martin | |
| 7,770,480 | B2 | 8/2010 | Martin | |
| 7,886,627 | B2 | 2/2011 | Martin | |
| 2002/0134637 | A1 | 9/2002 | Salecker et al. | |
| 2002/0144563 | A1 | 10/2002 | Forsyth | |
| 2003/0010144 | A1 | 1/2003 | Petzold | |
| 2003/0084739 | A1 | 5/2003 | Koerber et al. | |
| 2003/0171186 | A1 | 9/2003 | Okada et al. | |
| 2004/0009840 | A1 | 1/2004 | Lutz et al. | |
| 2004/0077458 | A1 | 4/2004 | Hartmann et al. | |
| 2005/0000307 | A1 * | 1/2005 | Gumpoltsberger | 74/331 |
| 2005/0072255 | A1 * | 4/2005 | McCrary et al. | 74/330 |
| 2005/0204841 | A1 * | 9/2005 | Baldwin et al. | 74/331 |
| 2006/0016282 | A1 | 1/2006 | Berger et al. | |
| 2006/0047395 | A1 | 3/2006 | Ikeya et al. | |
| 2006/0163021 | A1 | 7/2006 | Tsukada et al. | |
| 2006/0207362 | A1 | 9/2006 | Martin | |
| 2006/0240941 | A1 | 10/2006 | Martin | |
| 2006/0281563 | A1 | 12/2006 | Martin | |
| 2007/0042864 | A1 | 2/2007 | Martin | |
| 2008/0093570 | A1 | 4/2008 | Martin | |
| 2008/0194370 | A1 | 8/2008 | Martin et al. | |
| 2009/0227419 | A1 | 9/2009 | Martin et al. | |
| 2009/0255357 | A1 | 10/2009 | Martin et al. | |
| 2009/0301241 | A1 | 12/2009 | Martin | |
| 2010/0257969 | A1 | 10/2010 | Martin et al. | |

FOREIGN PATENT DOCUMENTS

| | | |
|---|---|---|
| DE | 607182 | 12/1934 |
| DE | 871670 C | 3/1953 |
| DE | 1450177 | 4/1970 |
| DE | 2324801 | 5/1973 |
| DE | 2324881 | 5/1973 |
| DE | 19835334 | 8/1998 |
| DE | 19903115 | 8/2000 |
| DE | 19939334 | 3/2001 |
| DE | 10037401 | 2/2002 |
| DE | 10138358 | 2/2003 |
| DE | 10157943 | 6/2003 |
| DE | 10339427 | 3/2005 |
| DE | 10 2004007759 | 9/2005 |
| DE | 10 2005040400 | 5/2007 |
| EP | 029711 A2 | 6/1981 |
| EP | 0584457 | 9/1995 |
| EP | 0677684 | 10/1995 |
| EP | 0797018 | 9/1997 |
| EP | 0809049 | 11/1997 |
| EP | 0849110 | 6/1998 |
| EP | 1072821 | 1/2001 |
| EP | 1344965 | 9/2003 |
| EP | 1439087 | 7/2004 |
| EP | 1 460305 A1 | 9/2004 |
| EP | 1452781 | 9/2004 |
| EP | 1471291 | 10/2004 |
| EP | 1519084 | 3/2005 |
| EP | 1564446 | 8/2005 |
| EP | 1584847 | 10/2005 |
| FR | 2025347 | 9/1970 |
| FR | 2312693 | 12/1976 |
| FR | 2583489 | 12/1986 |
| FR | 2810713 | 12/2001 |
| FR | 2853372 | 10/2004 |
| GB | 1461094 | 1/1977 |
| GB | 2100812 A | 1/1983 |
| GB | 2159897 A | 12/1985 |
| GB | 225819 | 6/1990 |
| GB | 2309754 | 8/1997 |
| GB | 2319817 | 6/1998 |
| GB | 2320531 | 6/1998 |
| JP | 63-088350 | 4/1988 |
| JP | 06-017890 | 1/1994 |
| WO | WO 96/28317 | 9/1996 |
| WO | WO 00/08360 | 2/2000 |
| WO | WO 01/29440 | 4/2001 |
| WO | WO 02/057108 | 7/2002 |
| WO | WO 03/078198 | 9/2003 |
| WO | WO 2004/005769 | 1/2004 |
| WO | WO 2004/099654 A1 | 11/2004 |
| WO | WO 2005/005868 A1 | 1/2005 |
| WO | WO 2005/005869 A1 | 1/2005 |
| WO | WO 2005/008092 | 1/2005 |
| WO | WO 2005/024261 A1 | 3/2005 |
| WO | WO 2005/026570 A1 | 3/2005 |
| WO | WO 2006/123128 | 11/2006 |

OTHER PUBLICATIONS

International Preliminary Report on Patentability and Written Opinion dated Nov. 19, 2007 for PCT Application No. PCT/GB2006/001853, filed May 18, 2006.

* cited by examiner

TRANSMISSION LAYOUT

RELATED APPLICATIONS

This application is the U.S. National Phase filing under 35 U.S.C. §371 of PCT/GB2006/001853, filed May 18, 2006, which designated the United States and was published in English, which claims priority under 35 U.S.C. §119(a)-(d) to Great Britain Patent Application No. 0510129.0, filed May 18, 2005. The contents of these applications is incorporated herein by reference in their entireties.

FIELD OF THE INVENTION

The present invention relates to transmission systems and selector mechanisms used in transmission systems to select a gear train, for example dog-type selector mechanisms.

BACKGROUND OF THE INVENTION

This application refers to a system and method for the elimination of a failure mode that can occur in transmission systems of the type described in WO 2004/099654, WO 2005/005868, WO 2005/005869, WO 2005/024261 and WO 2005/026570. However, similar problems may occur in other types of transmission systems.

The known systems disclosed in the above-mentioned publications are examples of instantaneous transmission systems. The known transmissions have a plurality of gear trains for transmitting drive between a transmission input shaft and a transmission output shaft. For a first gear train, a first gear wheel is rotatably mounted on one of a transmission input shaft and an output shaft and a second gear wheel is fixed to the other shaft, in mesh with the first gear wheel. A second gear train comprising third and fourth gear wheels is similarly arranged. The transmission also includes at least one gear selector mechanism that is located between the rotatably mounted gear wheels that is arranged to selectively lock them for rotation with the shaft on which they are mounted. When a gear wheel from a gear train is locked for rotation with the shaft, drive is transmitted between the input and output shafts via that gear train.

The arrangement is such that when drive is transmitted between the input and output shafts via one of the gear trains, for example the first gear train, the gear selector mechanism can select the new (second) gear train under power without disengaging the first gear train, by locking the rotatably mounted gear wheel of the second gear train to its shaft. Thus momentarily, drive is transmitted between the input and output shaft via two gear trains. The new gear train then overdrives the first gear train and the selector mechanism disengages the first gear wheel. Drive is then transmitted between the input and output shafts via the new gear train only, thus providing uninterrupted power through a gearshift. The selector mechanism is arranged such that the gearshifts can take place under acceleration or deceleration.

The gear selector mechanisms of the known transmissions have four modes with respect to each adjacent gear train:
Fully engaged in both torque directions (fully in gear);
Disengaged in both torque directions (neutral);
Engaged in the forward torque direction while disengaged in the reverse torque direction;
Disengaged in the forward toque direction while engaged in the reverse torque direction.

The last two of the above four modes enable a discrete ratio gearbox to have the ability to shift up or down ratios instantly under load without torque interruption.

There is an inherent failure mode in any gearbox with more that two gear trains that has both of the last two modes. Thus it is possible in instantaneous transmission systems having at least three gear trains for two gears to be engaged simultaneously with opposing modes under some conditions, which causes the transmission to lock up. One of the most dangerous scenarios is if the direction of torque changes during a shift. If torque has a constant known direction during a shift, the natural sequence of events prevents the above failure mode. During a sudden reversal of the direction of torque immediately prior to, or during a shift, there is potential for the above failure mode to occur.

A transmission system typically includes at least three gear trains, and is likely to include four to six gear trains. A transmission having four gear trains requires two instantaneous gear selector mechanisms. The first gear selector mechanism is arranged to selectively engage the first and second gear trains and the second gear selector mechanism is arranged to selectively engage the third and fourth gear trains. Each gear selector mechanism includes first and second sets of engagement members having opposing ends with fixed opposing directions of torque transfer. This provides an inherent failsafe arrangement against the above mentioned failure mode where the shift is from a gear on one side of the hub (selector mechanism) to a gear on the other side of the same hub, for example when the first selector mechanism selects between the first and second gears or when the second selector mechanism selects between the third and fourth gears.

The above failure mode can only occur if a gearshift is from a gear that is engageable by one of the gear selector mechanisms to a gear that is engageable by the other gear selector mechanism, for example when changing between second and third gears in the four speed transmission mentioned above, since this requires movement of both the first and second gear selector mechanisms. The first gear selector mechanism has to move out of engagement with the second gear train and the second gear selector mechanism has to move into engagement with the third gear train. If a torque reversal occurs when the second gear is still engaged by the first selector mechanism and the third gear is engaged by the second selector mechanism, the transmission may lock up.

The transmission described in PCT/GB2006/000743 addresses the above-mentioned problems by using a layout that is inherently safe. The layout ensures that each gear change takes place across the hub of a single gear selector devices, which is inherently safe. This is achieved by including a gear train that is arranged to be selected by the first and second instantaneous gear selector devices and by alternating subsequent gear selector devices on the input and output shafts of the transmission.

WO 2005/0058648 describes an electronic control system for measuring the direction of torque in the gearbox and managing some shifts such as a kick-down shift. By measuring the magnitude and direction of torque on all shifts it is possible to prevent gearbox lock up due to conflicting modes being engaged in two gears at once. However, control systems are complex and may introduce new failure modes into the transmission system. Since the control system does not affect the relative positions of the gear trains and the selector mechanisms in the instantaneous transmissions described above, the transmission layout remains inherently prone to the failure modes mentioned above should a problem occur with the control system.

United Kingdom patent application number GB0504628.9 teaches a transmission system that addresses the above problems by designing out the possibility of catastrophic gearshifts from taking place. A layout is used for a sequential transmission that alternates the gearshifts between instantaneous selector mechanisms located on different shafts.

Accordingly the present invention seeks to provide an improved transmission system that mitigates at least some of the aforementioned problems or at least provides an alternative solution to those problems.

SUMMARY OF THE INVENTION

According to one aspect of the invention there is provided a transmission system including first and second shafts, a plurality of gear trains arranged to transfer drive between the first and second shafts, an instantaneous selector mechanism, and at least one non-instantaneous selector mechanism, wherein the instantaneous selector mechanism and the or each non-instantaneous selector mechanism are arranged to create torque paths between the first and second shafts via the gear trains, wherein each gear train is selectable when another gear train is transmitting torque.

The inventors have discovered that the conflict shift problems described above can be eliminated by having a transmission that uses a combination of a single instantaneous selector mechanism and at least one non-instantaneous selector mechanism, without loosing the ability to select new gear trains instantaneously, since the conflict only occurs when a transmission includes more that one instantaneous gear selector mechanism. By instantaneous it is meant that the selector mechanism is capable of selecting two gear trains simultaneously such that at least momentarily torque can be transmitted between the first and second shafts via both of the gear trains. For example, the selector mechanisms of the type described in the following documents are instantaneous selector mechanisms: WO 2004/099654, WO 2005/005868, WO 2005/005869, WO 2005/025161 and WO 2005/026570, which are hereby incorporated by reference. The selector mechanisms described in those documents are constructed and arranged such that they can momentarily simultaneously lock two gear elements from different gear trains (gear ratios) for rotation with a shaft until one gear ratio overdrives the other gear ratio. Thus a new gear train can be selected without loss of drive. By non-instantaneous it is meant that the selector mechanism is not arranged to lock more than one gear element for rotation with the shaft simultaneously. For example, conventional dog or synchromesh transmission systems are non-instantaneous transmission systems.

Preferably the or each non-instantaneous selector mechanism is arranged to select a gear train prior to selection by the instantaneous selector mechanism. This sequence helps to ensure that the gear train selections can be made without loss of drive.

Advantageously the plurality of gear trains can be positioned either side of the instantaneous gear selector device. Preferably the plurality of gear trains are arranged such that the odd and even gears are arranged on alternate sides of the instantaneous selector mechanism.

According to another aspect of the present invention there is provided a transmission system including a first shaft, a first body rotatably mounted on the first shaft, a first gear train having a first gear element arranged to be driven by the first body, a second gear train having a second gear element arranged to be driven by the first body, and a first selector mechanism arranged to selectively lock the first body for rotation with the first shaft.

The first selector mechanism is an instantaneous selector mechanism. The inventors have discovered that an important feature for enabling the conflict problem to be overcome using a single instantaneous selector mechanism in conjunction with one or more non-instantaneous selector mechanisms is that the instantaneous selector mechanism must be able to select a plurality of gear trains on at least one side of the instantaneous selector mechanism. This is achieved by mounting gear elements from a plurality of gear trains onto the first body. The first body is rotatably mounted on the first shaft on one side of the instantaneous selector mechanism and the selector mechanism is able to select the first and second gear trains by selectively engaging the first body. Which gear train transmits torque is determined by the position of a non-instantaneous gear selector device and how each gear element is mounted on the first body (see below).

Preferably the first body includes a sleeve member, wherein the sleeve member is mounted on the first shaft on bearings and the first and second gear elements are mounted on the first body. Advantageously the first body includes engagement formations arranged for engagement with the first selector mechanism. Preferably the first body includes a flange and the engagement formations are located on the flange.

Preferably the transmission includes a second shaft and a second selector mechanism, wherein the first gear train includes a third gear element mounted on the second shaft and the second gear train includes a fourth gear element mounted on the second shaft, and the first and second selector mechanisms are arranged to selectively transmit torque between the first and second shafts via the first and second gear trains. The second selector mechanism is a non-instantaneous selector mechanism.

Advantageously the transmission may include a second body rotatably mounted on the first shaft, a third gear train having a fifth gear element arranged to be driven by the second body, a fourth gear train having a sixth gear element arranged to be driven by the second body, wherein the first selector mechanism is arranged to selectively lock the second body for rotation with the first shaft. The second body is rotatably mounted on the first shaft on the opposite side of the instantaneous selector mechanism from the first body and the selector mechanism is able to select the third and fourth gear trains by selectively engaging the first body. Which gear train transmits torque is determined by the position of a non-instantaneous gear selector device and how each gear element is mounted on the second body (see below).

Preferably the second body comprises a sleeve member, wherein the sleeve member is mounted on the first shaft on bearings and the fifth and sixth gear elements are mounted on the first body. Advantageously the second body includes engagement formations arranged for engagement with the first selector mechanism. Preferably the second body includes a flange and the engagement formations are located on the flange.

Advantageously the transmission may include a third selector mechanism, wherein the third gear train includes a seventh gear element mounted on the second shaft and the fourth gear train includes an eighth gear element mounted on the second shaft, and the first and third selector mechanisms are arranged to selectively transmit torque between the first and second shafts via the third and fourth gear trains. The third selector mechanism is a non-instantaneous selector mechanism.

In a first embodiment the first and second gear elements are fixed for rotation with the first body, the third and fourth gear elements are rotatably mounted on the second shaft, and the second selector mechanism is arranged to selectively lock the third and fourth gear elements for rotation with the second shaft independently of each other. The second selector mechanism is arranged to lock third gear element for rotation with the second shaft before the first selector mechanism locks the first body for rotation with the first shaft during a gearshift. That is, the second selector mechanism pre-selects the third gear element by moving into engagement therewith when selecting the first gear train.

Preferably the second selector mechanism is arranged to lock fourth gear element for rotation with the second shaft before the first selector mechanism locks the first body for rotation with the first shaft during a gearshift. That is, the second selector mechanism pre-selects the fourth gear element by moving into engagement therewith when selecting the second gear train.

The fifth and sixth gear elements are fixed for rotation with the second body, the seventh and eighth gear elements are rotatably mounted on the second shaft, and the third selector mechanism is arranged to selectively lock the seventh and eight gear elements for rotation with the second shaft independently of each other. The third selector mechanism is preferably arranged to lock seventh gear element for rotation with the second shaft before the first selector mechanism locks the second body for rotation with the first shaft during a gearshift. That is, the third selector mechanism pre-selects the seventh gear element by moving into engagement therewith when selecting the third gear train. Preferably the third selector mechanism is arranged to lock eighth gear element for rotation with the second shaft before the first selector mechanism locks the second body for rotation with the second shaft during a gearshift. That is, the third selector mechanism pre-selects the eighth gear element by moving into engagement therewith when selecting the second gear train.

The transmission system may include any practicable number of gear ratios and each additional gear ratio will be arranged similarly to those mentioned above. For example, a fifth gear train comprising ninth and tenth gear elements could be included in the following manner. The ninth gear element is fixed to the first body and the tenth gear element is rotatably mounted on the second shaft. Preferably the transmission system includes a fourth selector mechanism for selectively locking the rotation of the tenth gear element with the rotation of the second shaft. The tenth gear element is mounted on the second shaft such that it can rotate about the second shaft independently of the other gear elements mounted thereon. The first, second and ninth gear elements are mounted on the first body such that they are locked for rotation about the first shaft with each other. Similarly, the other gear wheels mounted on the second shaft are arranged to rotate about the second shaft independently of each other. The fifth and sixth gear elements are mounted on the second body such that they are locked for rotation about the first shaft with each other.

Preferably the gear elements mounted on the first body are all part of either odd or even gear trains. For example, in automotive applications the gear trains associated with the first body are all odd gears ($1^{st}$, $3^{rd}$, $5^{th}$, etc) or all even gears ($2^{nd}$, $4^{th}$, $6^{th}$, etc). The gear trains associated with the second body are the alternative set. In this arrangement, the first selector mechanism can alternately lock the first and second bodies for rotation with the first shaft to move from an odd gear to an even gear.

In other embodiments the transmission system can be arranged such that alternate gear trains on each side of the first selector device have opposite rotatably mounted and fixed gear elements.

For example, in a second embodiment the first gear element is rotatably mounted on the first body, the second gear element is locked for rotation with the first body, the third gear element is locked for rotation with the second shaft, the fourth gear element is rotatably mounted on the second shaft, and the second selector mechanism is arranged to selectively lock the fourth gear wheel for rotation with the second shaft. The second selector mechanism includes an actuator and engagement members formed or mounted on the third gear element, wherein the third gear element is arranged for axial movement along the second shaft. This enables the third gear element to move along the second shaft into and out of engagement with the fourth gear element. The fourth gear element includes drive formations on one side. The actuator controls the axial movement of the third gear element. The extent of the axial movement is controlled to ensure the third gear element remains in mesh with the first gear element.

Preferably the second embodiment includes a fourth selector mechanism arranged to selectively lock the first gear element for rotation with the first body. The fourth selector mechanism is a non-instantaneous selector mechanism. The fourth selector mechanism includes an actuator and engagement members formed or mounted on the second gear element, wherein the second gear element is arranged for axial movement along the first body. This enables the second gear element to move along the first body into and out of engagement with the first gear element. The first gear element includes drive formations on a side. The actuator controls the axial movement of the first gear element. The extent of the axial movement is controlled to ensure that the second gear element remains in mesh with the fourth gear element.

Preferably the second embodiment includes a fifth gear train including a ninth gear element rotatably mounted on the first body and a tenth gear element fixed for rotation with the first shaft, wherein the fourth selector mechanism is arranged to selectively lock the ninth gear element for rotation with the first body. The fifth gear element may be rotatably mounted on the second body, the sixth gear element is locked for rotation with the second body, the seventh gear element is locked for rotation with the second shaft, the eighth gear element is rotatably mounted on the second shaft, and the third selector mechanism is arranged to selectively lock the eighth gear wheel for rotation with the second shaft.

Advantageously the third selector mechanism may include an actuator and engagement members formed or mounted on the seventh gear element, wherein the seventh gear element is arranged for axial movement along the second shaft. This enables the seventh gear element to move along the second shaft into and out of engagement with the eighth gear element. The eighth gear element includes drive formations on one side. The actuator controls the axial movement of the seventh gear element. The extent of the axial movement is controlled to ensure the seventh gear element remains in mesh with the fifth gear element.

Advantageously the transmission may include a fifth selector mechanism arranged to selectively lock the fifth gear element for rotation with the second body. Preferably the fifth selector mechanism includes an actuator and engagement members formed or mounted on the sixth gear element, wherein the sixth gear element is arranged for axial movement along the second body. This enables the sixth gear element to move along the second body into and out of engagement with the fifth gear element. The fifth gear element includes drive formations on a side. The actuator controls the axial movement of the fifth gear element. The extent of the axial movement is controlled to ensure that the sixth gear element remains in mesh with the eighth gear element.

The transmission may include a sixth gear train including an eleventh gear element rotatably mounted on the second body and a twelfth gear element fixed for rotation with the second shaft, wherein the fifth selector mechanism is arranged to selectively lock the eleventh gear element for rotation with the second body. The sixth gear wheel includes formations arranged to engage drive formations located on the side of the eleventh gear element.

For any versions of the transmission, the instantaneous and/or first selector mechanism may include first and second sets of engagement members.

Preferably the instantaneous and/or first selector mechanism is arranged such that when a braking force is transmitted the first set of engagement members drivingly engages the first body, and the second set of engagement members is in an unloaded condition, and when a driving force is transmitted the second set of engagement members drivingly engages the first body, and the second set of engagement members is then in an unloaded condition.

Preferably the instantaneous and/or first selector mechanism is arranged such that when a braking force is transmitted the second set of engagement members drivingly engages the second body, and the first set of engagement members is in an unloaded condition, and when a driving force is transmitted the first set of engagement members drivingly engages the second body, and the first set of engagement members is then in an unloaded condition.

Preferably the instantaneous and/or first selector mechanism is arranged to bias a set of engagement members drivingly engaged with the first body out of engagement with the first body without disengaging the loaded set of engagement members from the first body.

Preferably the instantaneous and/or first selector mechanism is arranged to bias a set of engagement members drivingly engaged with the second body towards the first body without disengaging the loaded set of engagement members from the second body.

Advantageously the instantaneous and/or first selector mechanism is arranged to select between the following four modes of operation with respect to the first and second bodies: fully engaged in both torque directions; disengaged in both torque directions; engaged in the forward torque direction while disengaged in the reverse torque direction; and disengaged in the forward toque direction while engaged in the reverse torque direction.

According to another aspect of the present invention there is provided a method of transmitting drive between first and second shafts via a gear train comprising, including: selecting the gear train with a non-instantaneous selector mechanism and subsequently selecting the gear train with an instantaneous selector mechanism.

According to the method the transmission preferably includes a first gear train comprising first and second gear elements, a second gear train comprising third and fourth gear elements, and a body that is rotatably mounted on the first shaft, wherein the first and third gear elements are mounted on the body and the instantaneous selector mechanism is arranged to lock the body for rotation with the shaft, and wherein at least one of the second and fourth gear elements is rotatably mounted on the second shaft and the non-instantaneous selector mechanism is arranged to selectively lock at least one of the second and fourth gear elements for rotation with the second shaft.

First and second embodiments of the present invention will now be described by way of example only with reference to FIGS. 1 to 7g, wherein:

DETAILED DESCRIPTION OF THE PREFERRED EMBODIMENT

First Embodiment
Transmission Layout

Figure 1:
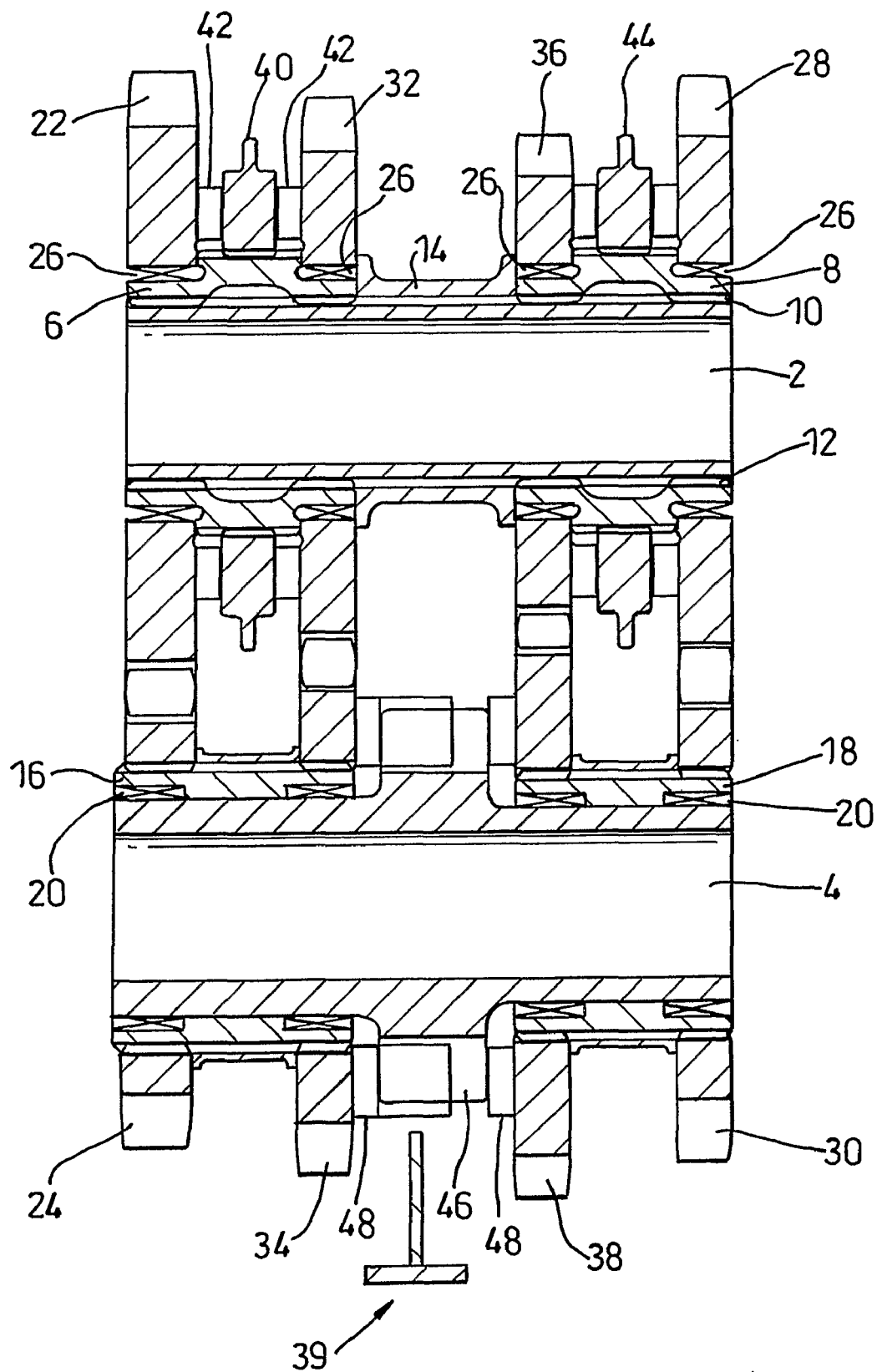
FIG. 1 is a sectional view of part of a first embodiment in neutral.
Figure 2:
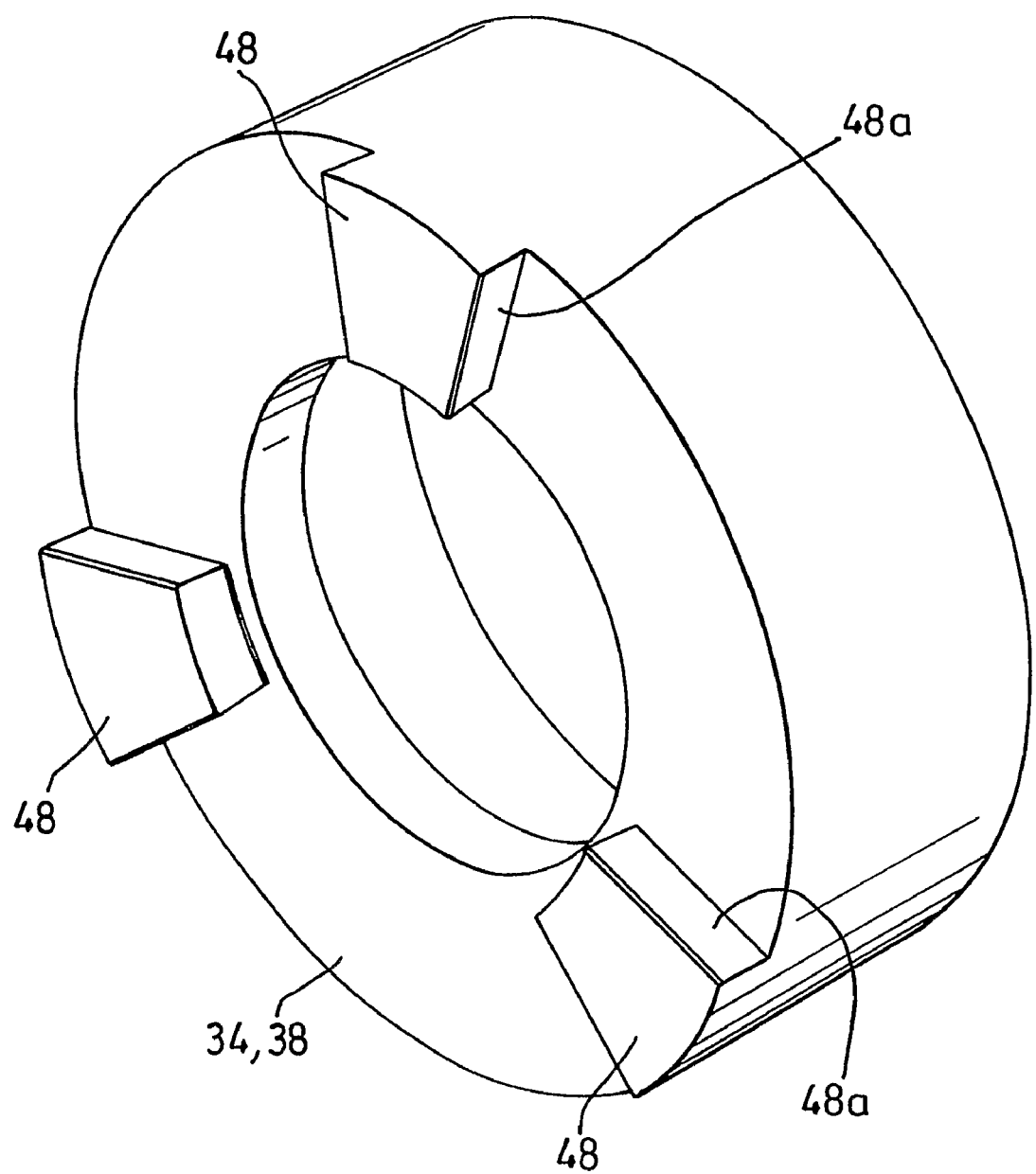
FIG. 2 is a schematic that illustrates the arrangement of a group of dogs on a side of a gear (teeth not shown for clarity)

FIG. 1 shows part of a transmission having an input shaft 2, an output shaft 4 and four gear ratios ($1^{st}$, $2^{nd}$, $3^{rd}$ and $4^{th}$ gears) for transmitting drive between the input and output shafts 2,4. The gear ratios are arranged such that odd gear ratios are on the left hand side of the transmission and the even gear ratios are on the right hand side. In the arrangement shown in FIG. 1 the gears are arranged in the order $1^{st}$, $3^{rd}$, $4^{th}$ and $2^{nd}$ from left to right.

The transmission includes first and second hubs 6,8, hereinafter referred to as the left and right hand hubs, that are mounted on the input shaft 2 and are locked for rotation therewith by splines 10,12. The left and right hand hubs 6,8 are separated by a first spacer member 14. The transmission also includes first and second sleeve members, 16,18, hereinafter referred to as the left and right hand sleeve members, that are mounted on the output shaft 4 via bearings 20 such that they can rotate relative to the output shaft 4 independently of each other.

The $1^{st}$ gear ratio ($1^{st}$ gear) comprises first and second gear wheels 22,24. The first gear wheel 22 is mounted on the left hand hub 6 towards one end via a bearing 26, the arrangement being such that the first gear wheel 22 can rotate relative to the left hand hub 6 and hence the input shaft 2. The second gear wheel 24 is mounted on the left hand sleeve member 16 towards one end and is locked for rotation therewith by a splined arrangement.

The $2^{nd}$ gear ratio ($2^{nd}$ gear) comprises third and fourth gear wheels 28,30. The third gear wheel 28 is mounted on the right hand hub 8 towards one end via a bearing 26, the arrangement being such that the third gear wheel 28 can rotate relative to the right hand hub 8 and hence the input shaft 2. The fourth gear wheel 30 is mounted on the right hand sleeve member 18 and is locked for rotation therewith by a splined arrangement.

The $3^{rd}$ gear ratio ($3^{rd}$ gear) comprises fifth and sixth gear wheels 32,34. The fifth gear wheel 32 is mounted on the left hand hub 6 via a bearing 26 and is located towards the opposite end to that carrying the first gear wheel 22, the arrangement being such that the fifth gear wheel 32 can rotate relative to the left hand hub 6 and hence the input shaft 2. The sixth gear wheel 34 is mounted on the left hand sleeve member 16 towards the opposite end to that carrying the second gear wheel 24 and is locked for rotation with the left hand sleeve member 16 by a splined arrangement. A second spacer member 17 separates the second and sixth gear wheels 24,34.

The 4$^{th}$ gear ratio (4$^{th}$ gear) comprises seventh and eighth gear wheels 36,38. The seventh gear wheel 36 is mounted on the right hand hub 8 via a bearing 26 and is located towards the opposite end to that carrying the third gear wheel 22, the arrangement being such that the seventh gear wheel 36 can rotate relative to the right hand hub 8 and hence the input shaft 2. The eighth gear wheel 38 is mounted on the right hand sleeve member 18 towards the opposite end to that carrying the fourth gear wheel 30 and is locked for rotation with the right hand sleeve member 18 by a splined arrangement. A third spacer member 19 separates the fourth and eighth gear wheels 30,38.

A first selector mechanism 40 is located on the left hand hub 6 between the first and fifth gear wheels 22,32. Preferably the first selector mechanism 40 is a conventional dog type engagement system that includes a dog ring for selectively engaging drive formations (dogs) 42 on the first and fifth gear wheels 22,32, thereby selectively locking the first and fifth gear wheels for rotation with the input shaft 2 independently of each other. Other types of conventional gear selector mechanisms can be used instead of the dog type, for example a synchromesh type selector mechanism.

A second selector mechanism 44 is located on the right hand hub 8 between the third and seventh gear wheels 28,36. The second selector mechanism 44 is similar to the first selector mechanism 40 and operates in a similar manner.

A third selector mechanism 46 is mounted on the output shaft 4 between the sixth and eighth gear wheels 34,38. The third selector mechanism 46 is of the instantaneous type, for example of the type described in WO 2004/099654, WO 2005/005868, WO 2005/005869, WO 2005/024261 and WO 2005/026570. The third selector mechanism 46 can simultaneously engage two gear wheels and lock both gear wheels for rotation with a shaft thereby enabling a gearshift to take place without loss of drive.

When the sixth gear wheel 34 is engaged by the third selector mechanism 46 the sixth gear wheel 34, the left hand sleeve member 16 and the second gear wheel 24 are locked for rotation with output shaft 4, thus the gear wheels 24,34 of the odd gears (1$^{st}$ and 3$^{rd}$) rotate with the output shaft 4. When the eighth gear wheel 38 is engaged by the third selector mechanism 46 the eighth gear wheel 38, the right hand sleeve member 18 and the fourth gear wheel 30 are locked for rotation with output shaft 4, thus the gear wheels 30,38 of the even gears (2$^{nd}$ and 4$^{th}$) rotate with the output shaft 4.

Selector Mechanism and Actuator

The third selector mechanism 46 includes first and second sets of engagement members 35,37 for engaging the drive formations 48, and the first and second sets of engagement members 35,37 are moveable into and out of engagement with the drive formations 48 independently of each other and are controlled by an actuator system 39. Thus the third selector mechanism 46 can engage one gear wheel with the first set of engagement members and simultaneously engage the other gear wheel with the second set of engagement members. Preferably each set of engagement members includes acceleration engagement parts and deceleration engagement parts. Each set of engagement members engages the drive formations 48 with either the acceleration engagement parts or the deceleration engagement parts.

When a gear wheel, for example the sixth gear wheel 34, is fully engaged both sets of engagement members can engage the drive formations 48 on that gear wheel. During a gearshift from an odd gear to an even gear, one set of engagement members moves out of engagement with the sixth gear wheel 34 and into engagement with the eighth gear wheel 38. Thus momentarily both the sixth and eighth gear wheels 34,38 are engaged and locked for rotation with the output shaft 4. Subsequently, the other set of engagement members moves out of engagement with the sixth gear wheel 34 and into engagement with the eighth gear wheel 38, thus fully engaging the eighth gear wheel 38.

The process is reversed for a gearshift from an even gear to an odd gear.

Drive is transmitted between the input and output shafts 2,4 via a particular gear ratio when both gear wheels of the ratio are locked for rotation with their respective shafts. Furthermore, the transmission layout enables all sequential gearshifts to take place without interruption of drive even though only one selector mechanism of the instantaneous type is used in the transmission layout. This will be become apparent from the description of the operation of the transmission below.

The sets of engagement bars 35,37 are mounted on a sleeve 59, which is mounted on the output shaft between the left and right hand sleeve members 16,18. The sets of engagement bars 35,37 are arranged to rotate with the output shaft 4 but are able to slide axially along the sleeve 59 and the output shaft 4 in response to a switching action of the actuator assembly 39. To facilitate this, the sleeve includes six keyways 41 formed in its curved surface with each engagement bar having a complementary formation in its base. The keyways 41 may have substantially T-shaped profiles such that the bars are radially and tangentially (but not axially) restrained within the keyways. Alternatively, the keyways can have slotted or dovetailed profiles to radially restrain the bars.

Preferably the bars are configured to be close to the output shaft 4 to prevent significant cantilever effects due to large radial distances of loaded areas thus reducing the potential for structural failure.

The arrangement of the bar sets 35,37 is such that bars of a particular set are located in alternate keyways 41 and the bar sets 35,37 can slide along the sleeve 59. The bars in each bar set are rigidly connected to each other by an annular member 47 and move as a unit. Each bar set can move independently of the other. The annular member has a groove 49 formed in its outer curved surface that extends fully around the annular member. The bars in the first set of engagement bars 35 are preferably integrally formed with its annular member 47, though this is not critical. The bars are evenly distributed about the annular member 47. The second set of engagement bars 37 comprises three bars, which are held in a similar fixed arrangement by a second annular member 45. When there is relative movement between the first and second sets of bars 35,37, the annular member 47 of the first bar set 35 slides over the second set of bars 37 and the annular member 45 of the second bar set 37 slides over the first set of bars 35.

Each bar in the first bar set 35 has a first end 35*a* arranged to engage the first group of dogs 48 attached to the sixth gear wheel 34 and a second end 35*b* arranged to engage the second group of dogs 48 on the eighth gear wheel 38. The first and second ends 35*a*,35*b* typically have the same configuration but are opposite handed, for example the first end 35*a* is arranged to engage the first group of dogs 48 during deceleration (reverse torque direction) of the sixth gear wheel 34 and the second end 35*b* is arranged to engage the second group of dogs 48 during acceleration (forward torque direction) of the eighth gear wheel 38. Each bar 37 in the second bar set 37 is similarly arranged, except that the first end 37*a* is arranged to engage the first group of dogs 48 during acceleration and the second end 37b is arranged to engage the second group of dogs 48 during deceleration.

When both the first and second sets of engagement bars 35,37 engage a set of dogs 48 drive can be transmitted when accelerating or decelerating.

Figure 4:
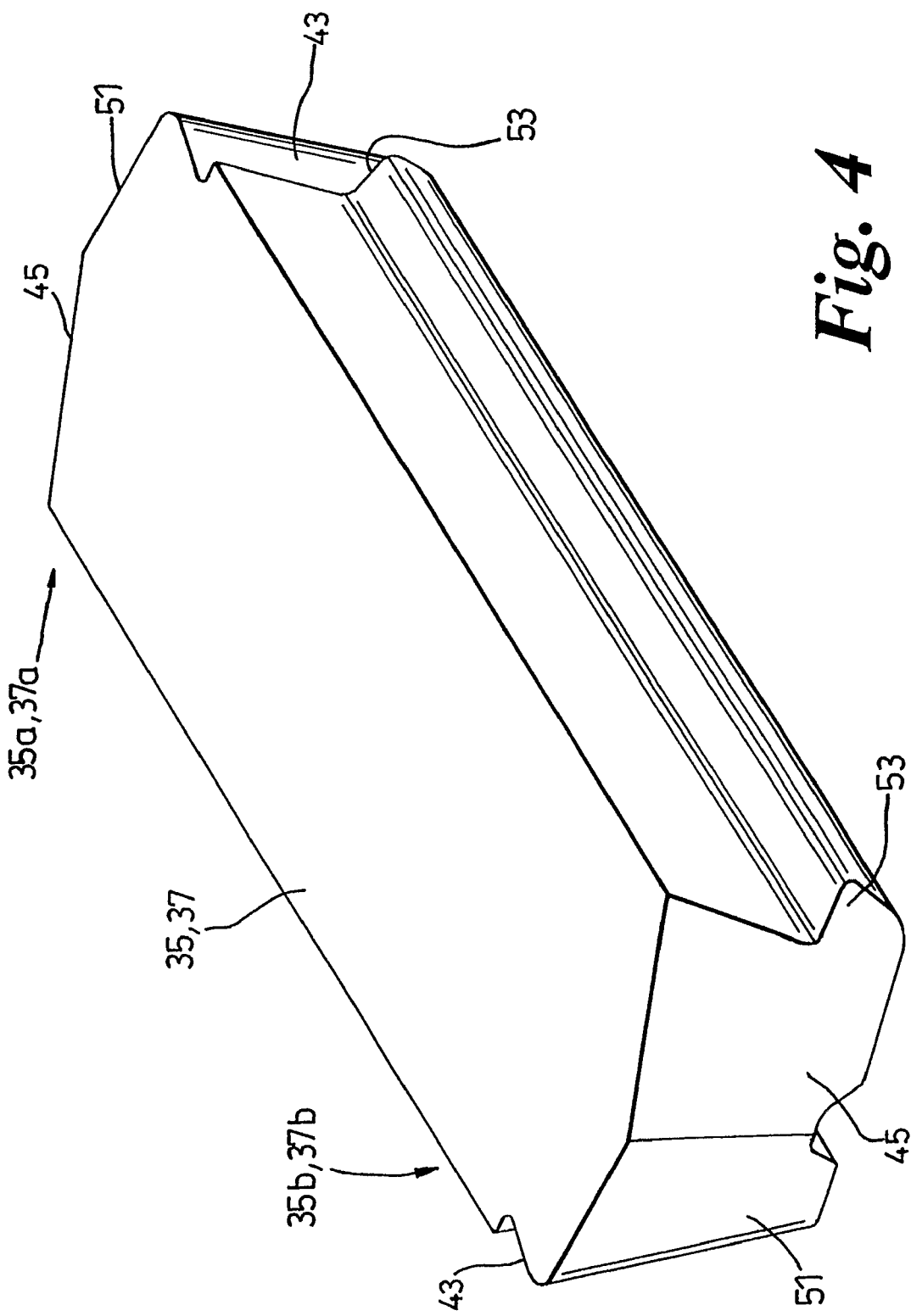
FIG. 4 is a perspective view of an engagement bar from the selector mechanism.

The first and second ends 35a,37a,35b,37b of each bar include an engagement face 43 for engaging the dogs 48, a ramp 45, an end face 51 and may include a shoulder 53 (see FIG. 4). The end faces 51 limit the axial movement of the engagement bars 35,37 by abutting the sides of the gear wheels. The engagement faces 43 may be angled to complement the sides of the dogs 48a so that as the engagement bars 35,37 rotate into engagement, there is face-to-face contact to reduce wear. Each ramp 45 is preferably helically formed and slopes away from the end face 51. The angle of inclination of the ramp 45 is such that the longitudinal distance between the edge of the ramp furthest from the end face 51 and the plane of the end face 51 is larger than the height of the dogs 48. This ensures that the transmission does not lock up when there is relative rotational movement between the engagement bars 35,37 and the dogs 48 that causes the ramp 45 to move towards engagement with the dogs 48. The dogs 48 do not crash into the sides of the engagement bars 35,37 but rather engage the ramps 45. As further relative rotational movement between the dogs 48 and the engagement bars 35,37 occurs, the dogs 48 slide across the ramps 45 and the helical surfaces of the ramps cause the engagement bars 35,37 to move axially along the output shaft 4 away from the dogs 48 so that the transmission does not lock up.

The arrangement of the gear selector mechanism is such that it inherently prevents lockup of the transmission occurring when selecting a new gear.

Figure 3:
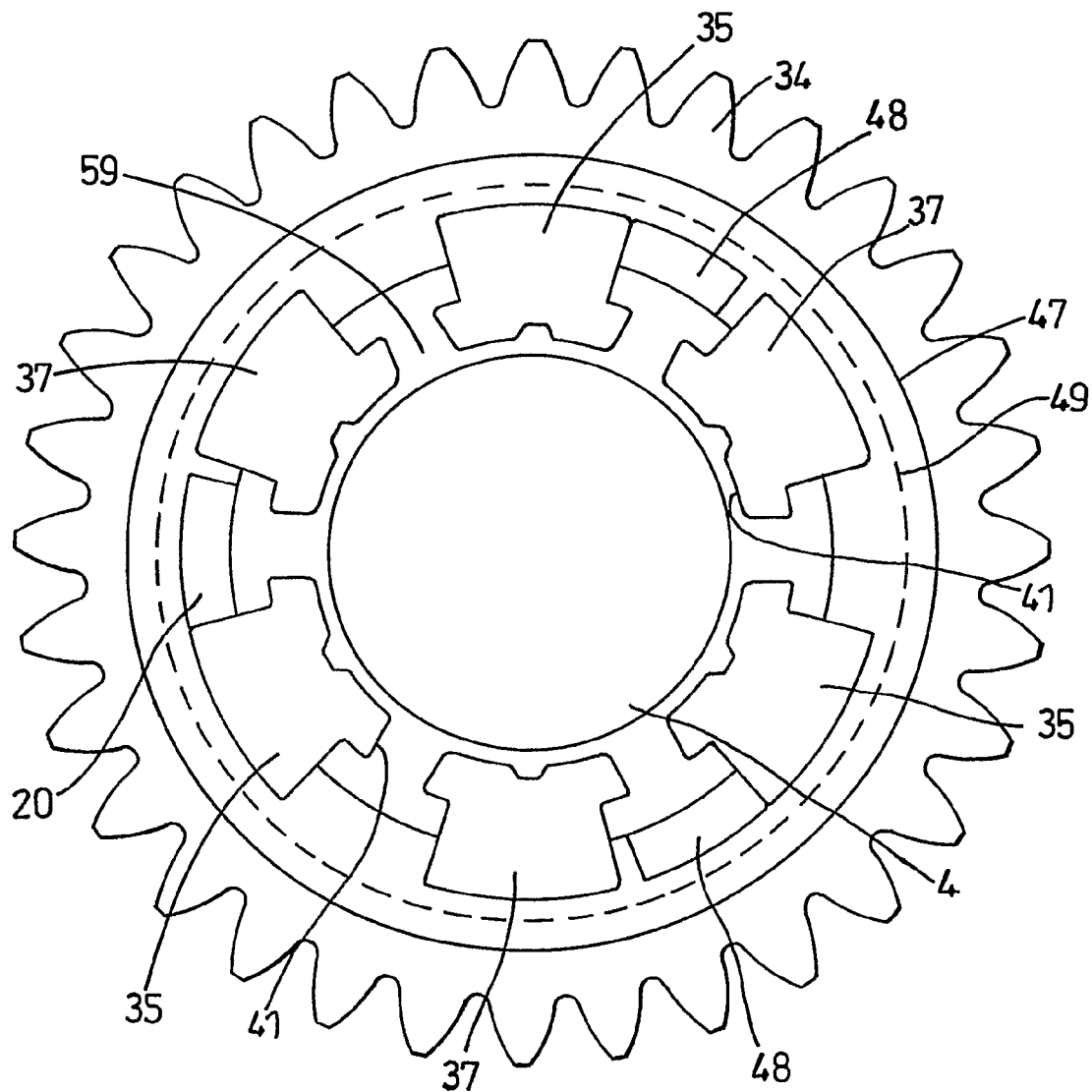
FIG. 3 is a schematic that illustrates the interaction of a selector mechanism and the dogs for driving left and right sleeve members.

When the bars of the first and second sets 35,37 are interleaved, as in FIG. 3, the engagement faces 43 of the first ends 35a of the first set of bars 35 are adjacent the engagement faces 43 of the first end 37a of the second set of bars 37. When the first and second sets of bars 35,37 are fully engaged with a gear, a dog 48 is located between each pair of adjacent engagement faces 43. The dimensions of the dogs 48 and the ends of the bars are preferably such that there is little movement of each dog between the engagement face 43 of the acceleration bar and the engagement face 43 of the deceleration bar when the gear moves from acceleration to deceleration, or vice versa, to ensure that there is little or no backlash in the gear.

The actuator assembly 39 controls the movement of the first and second sets of engagement bars 35,37. The assembly 39 includes a frame member, an actuator, a first actuator member and first and second helical springs. Movement of the first set of engagement bars 35 is controlled by movement of the first actuator member, which is controlled by the actuator. The first and second springs are arranged to bias the first set of engagement bars 35 to move in an axial direction when they are in driving engagement with a gear wheel and are unable to move. The assembly 39 includes, a second actuator member and third and fourth helical springs. Movement of the second set of engagement bars 37 is controlled by movement of the second actuator member, which is controlled by the actuator. The third and fourth helical springs are arranged to bias the second set of engagement bars to move in an axial direction when they are in driving engagement with a gear wheel and are unable to move.

Each actuator member is arranged to extend approximately 180 degrees around the groove 49 of its respective set of engagement bars and includes a semi-annular part that is located within the groove 49. Each set of engagement bars 35,37 can rotate relative to its respective actuator member and is caused to move axially along the output shaft 4 by the actuator member applying a force to the annular member 47.

The operation of the third selector mechanism 46 will now be described with reference to FIGS. 5a-5f which for clarity illustrate diagrammatically the movement of the first and second bar sets 35,37 by the relative positions of only one bar from each set.

Figure 5A:
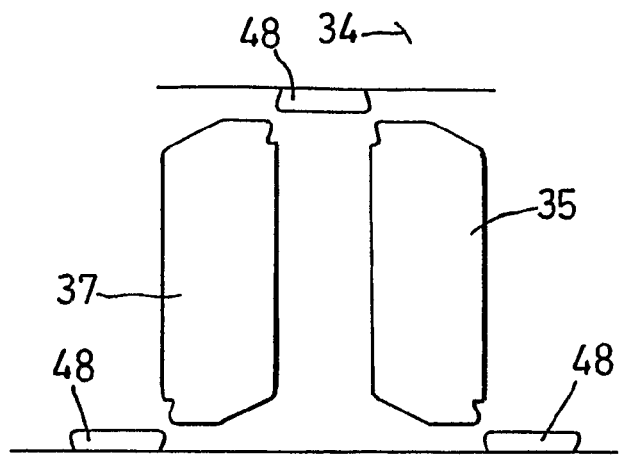
FIGS. 5$a$-$f$ show diagrammatically the operation of the selector mechanism.
Figure 5B:
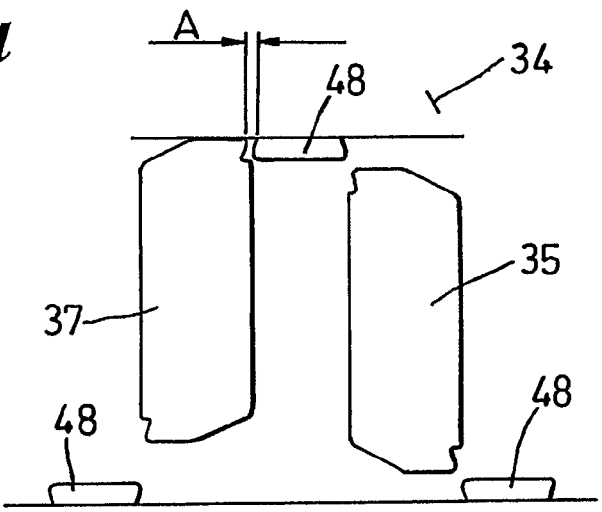

FIG. 5a shows the first and second bar sets 35,37 in a neutral position, that is, neither bar set is engaged with a gear wheel. FIG. 5b shows the first and second bar sets moving into engagement with the sixth gear wheel 34 under the action of the actuator assembly 39.

Figure 5C:
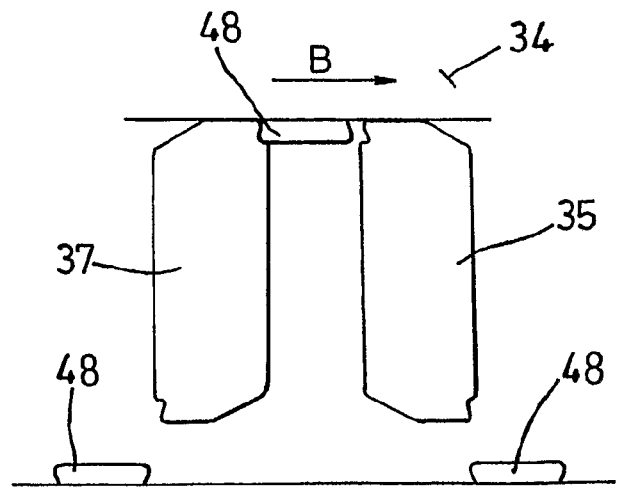
Figure 5D:
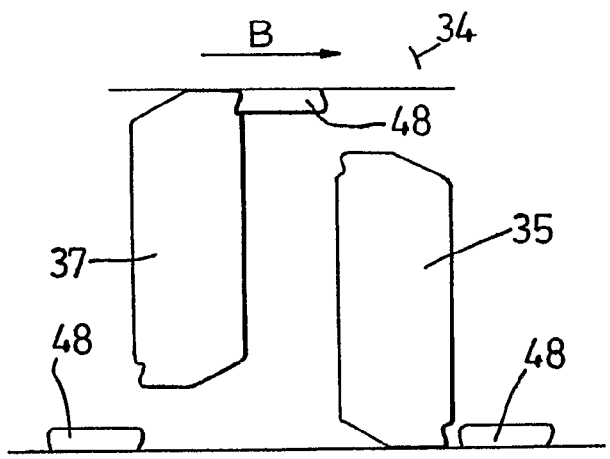
Figure 5E:
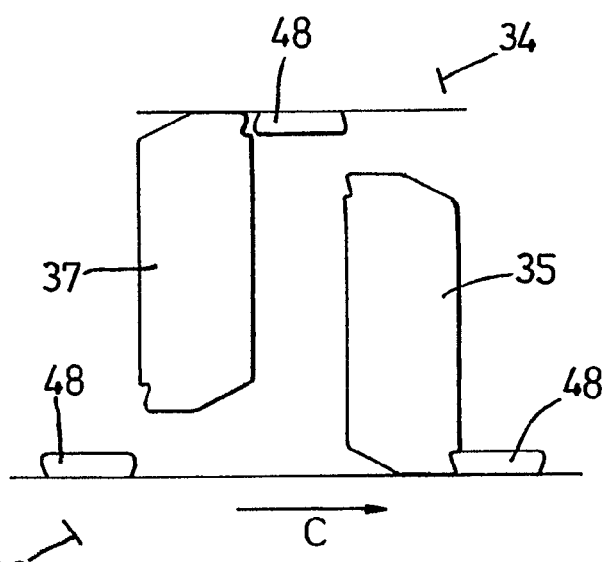
Figure 5F:
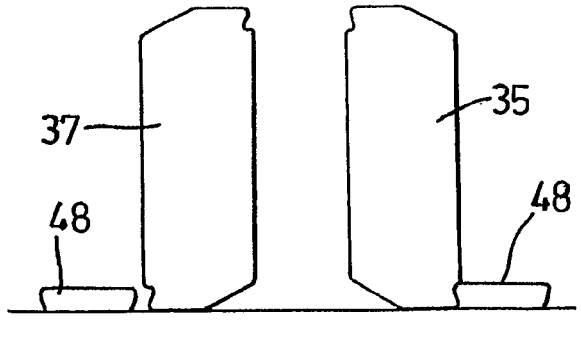
Figure 6A:
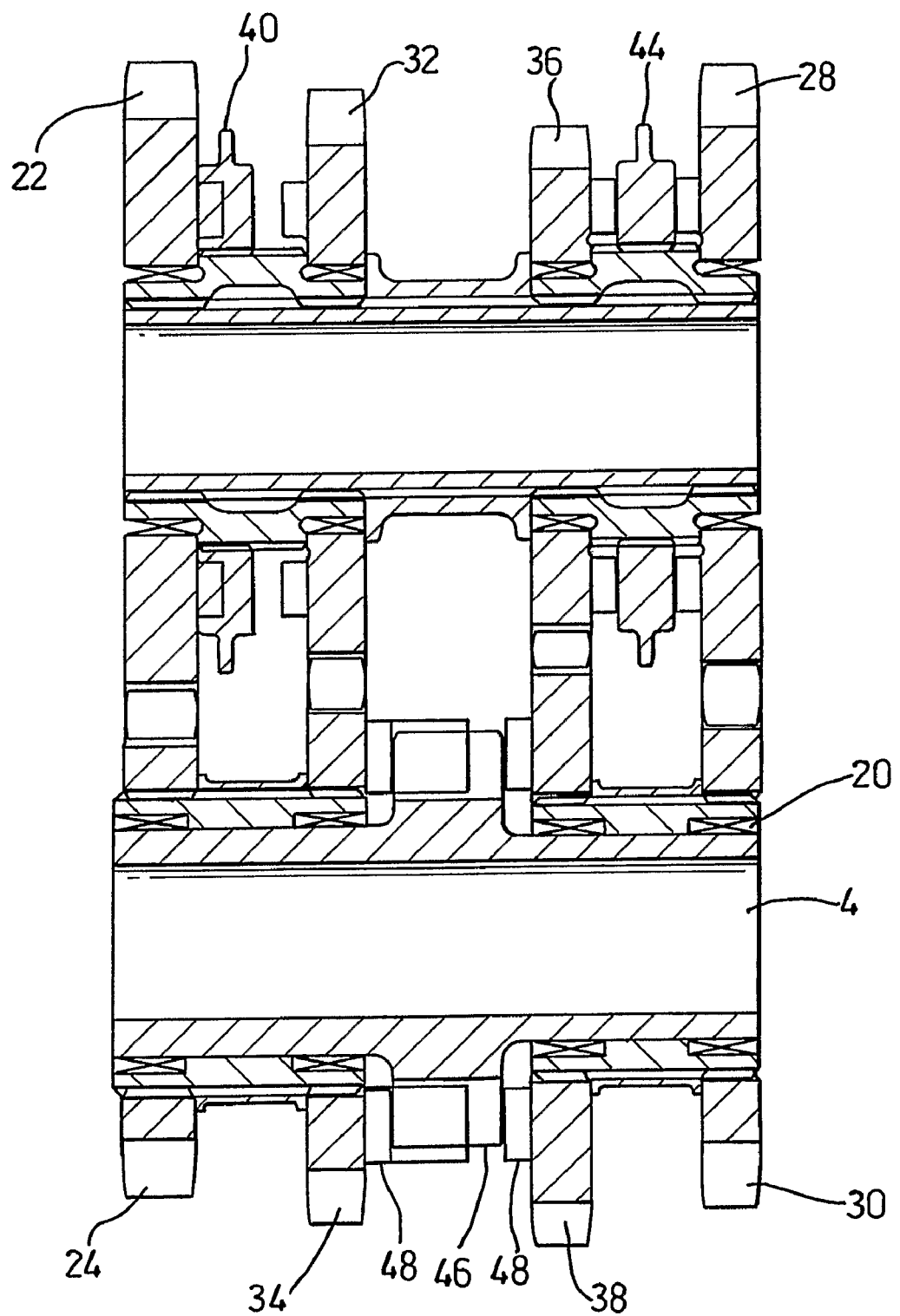
FIGS. 6$a$-$g$ show a sequence of movements of selector assemblies for the first embodiment moving from neutral to select $1^{st}$ (FIG. 6$a$), $2^{nd}$ (FIGS. 6$b$-$c$), $3^{rd}$ (FIGS. 6$d$-$e$) and $4^{th}$ (FIGS. 6$f$-$g$) gears sequentially.
Figure 6B:
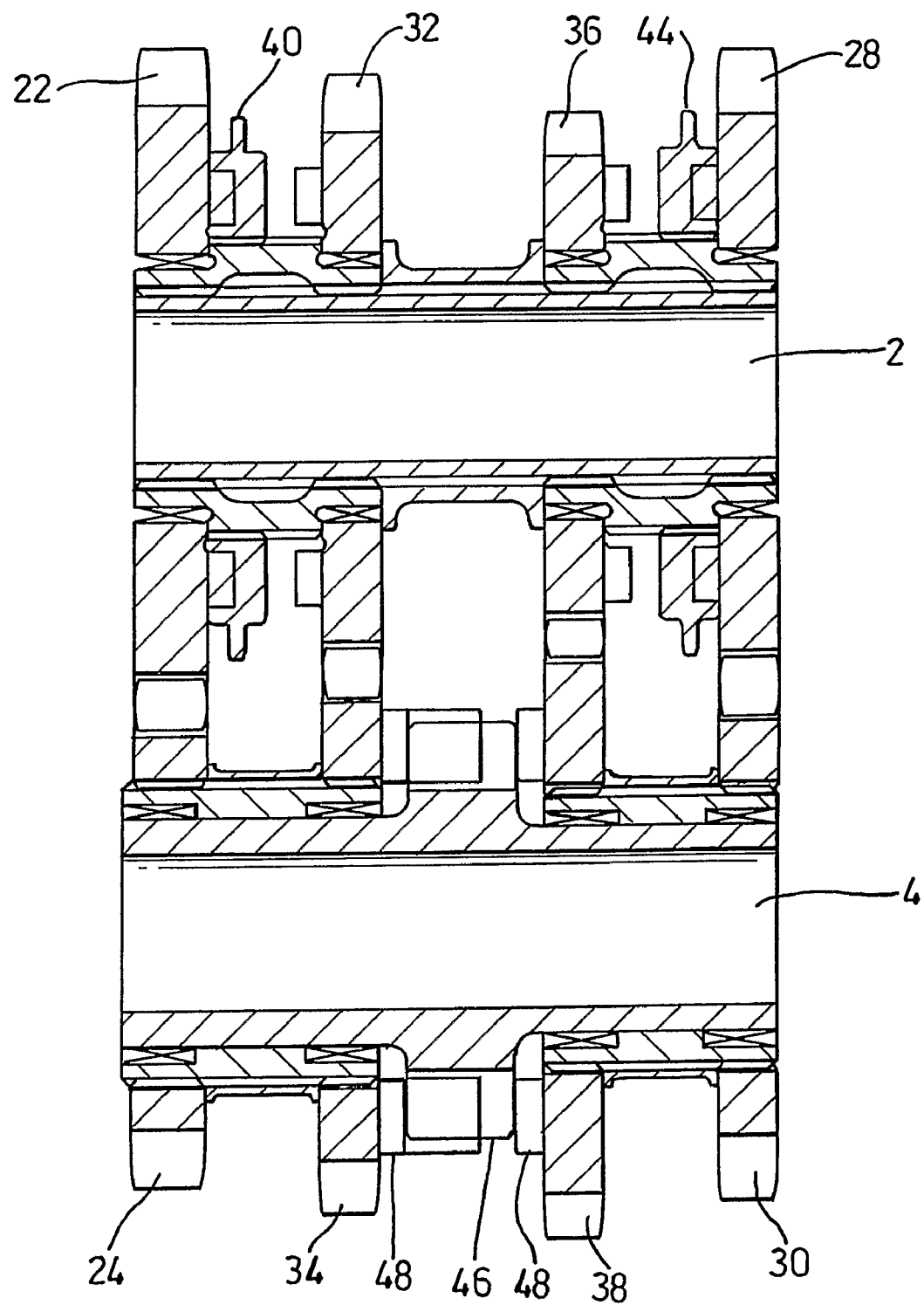
Figure 6C:
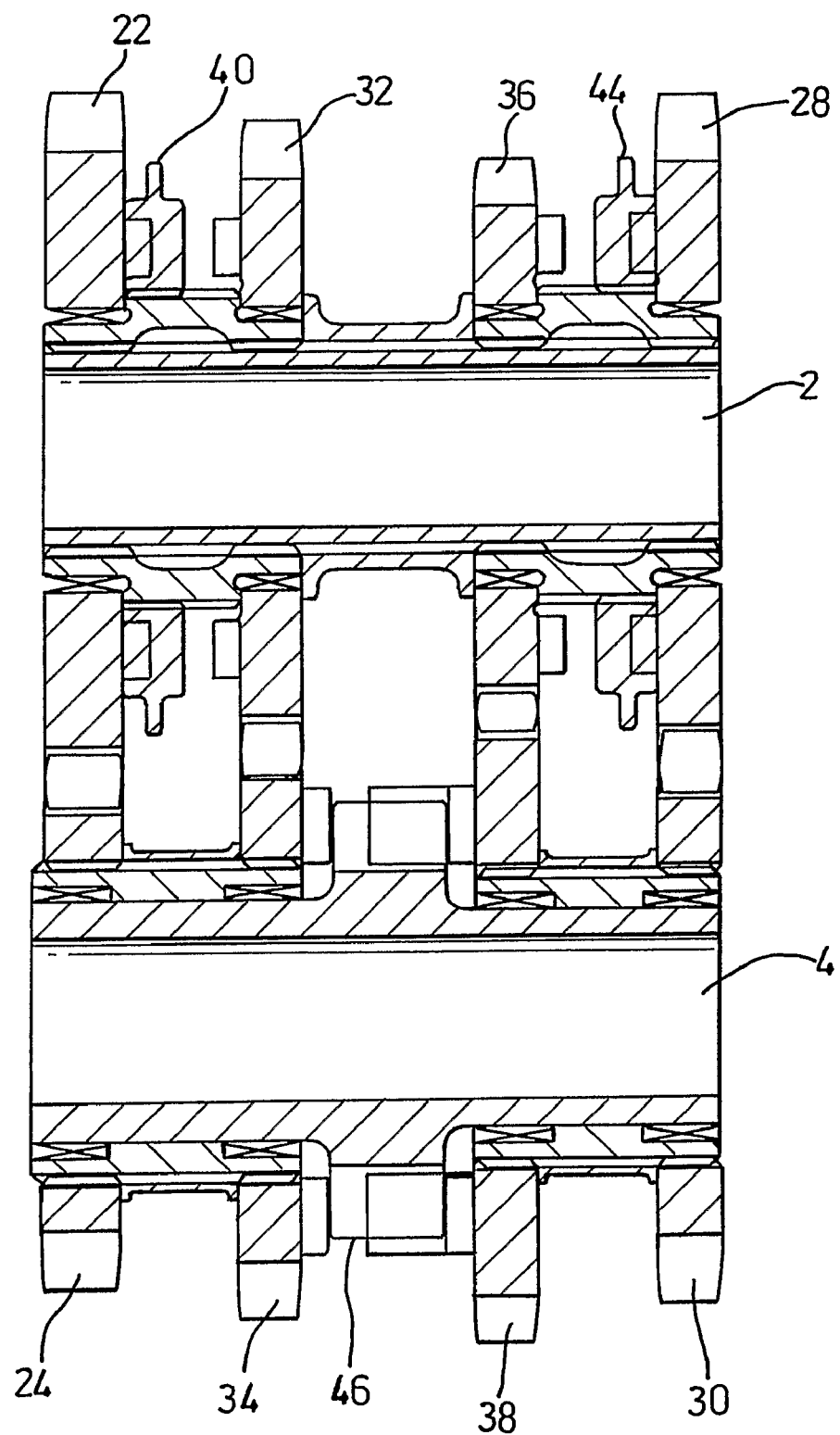
Figure 6D:
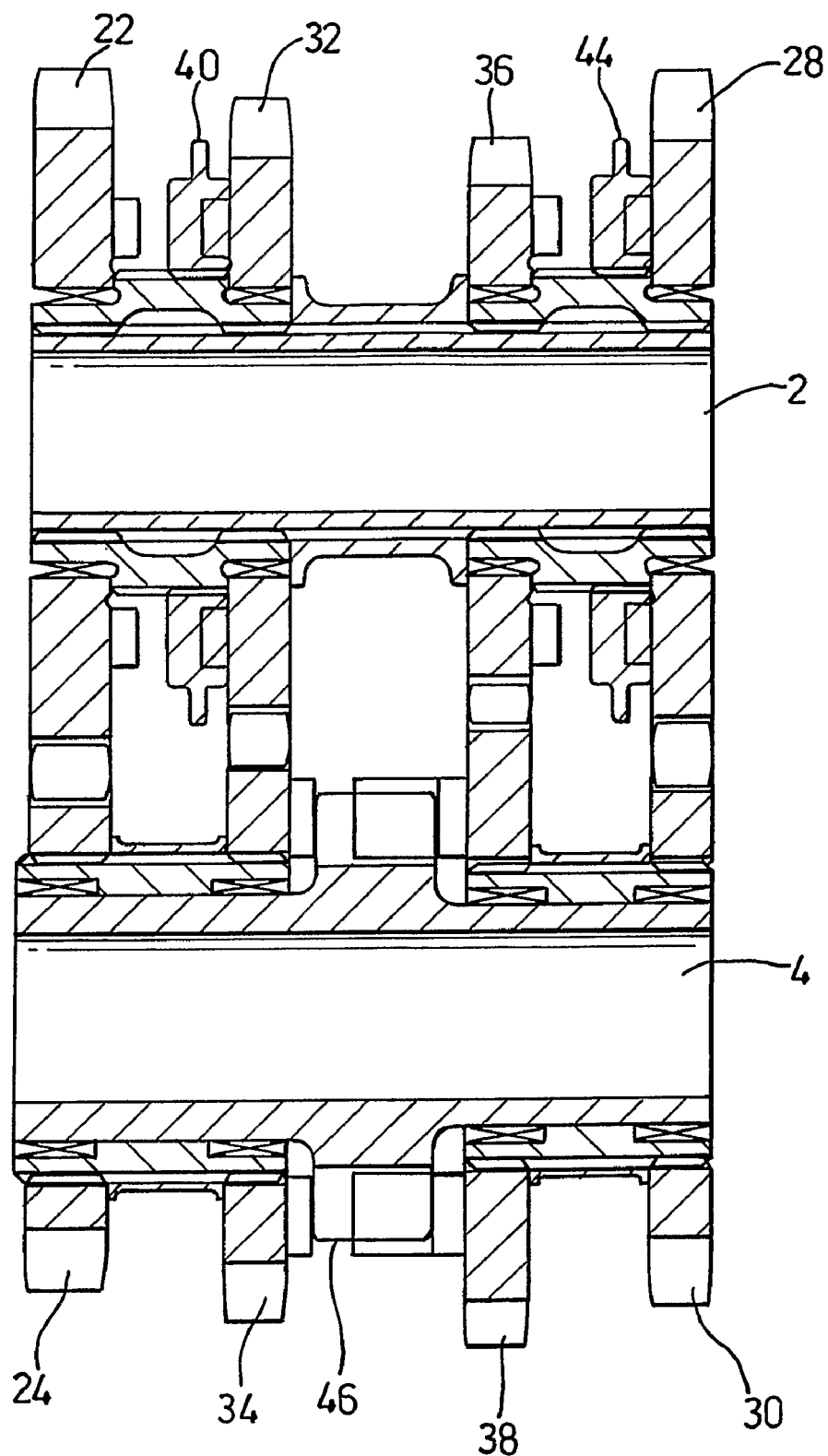
Figure 6E:
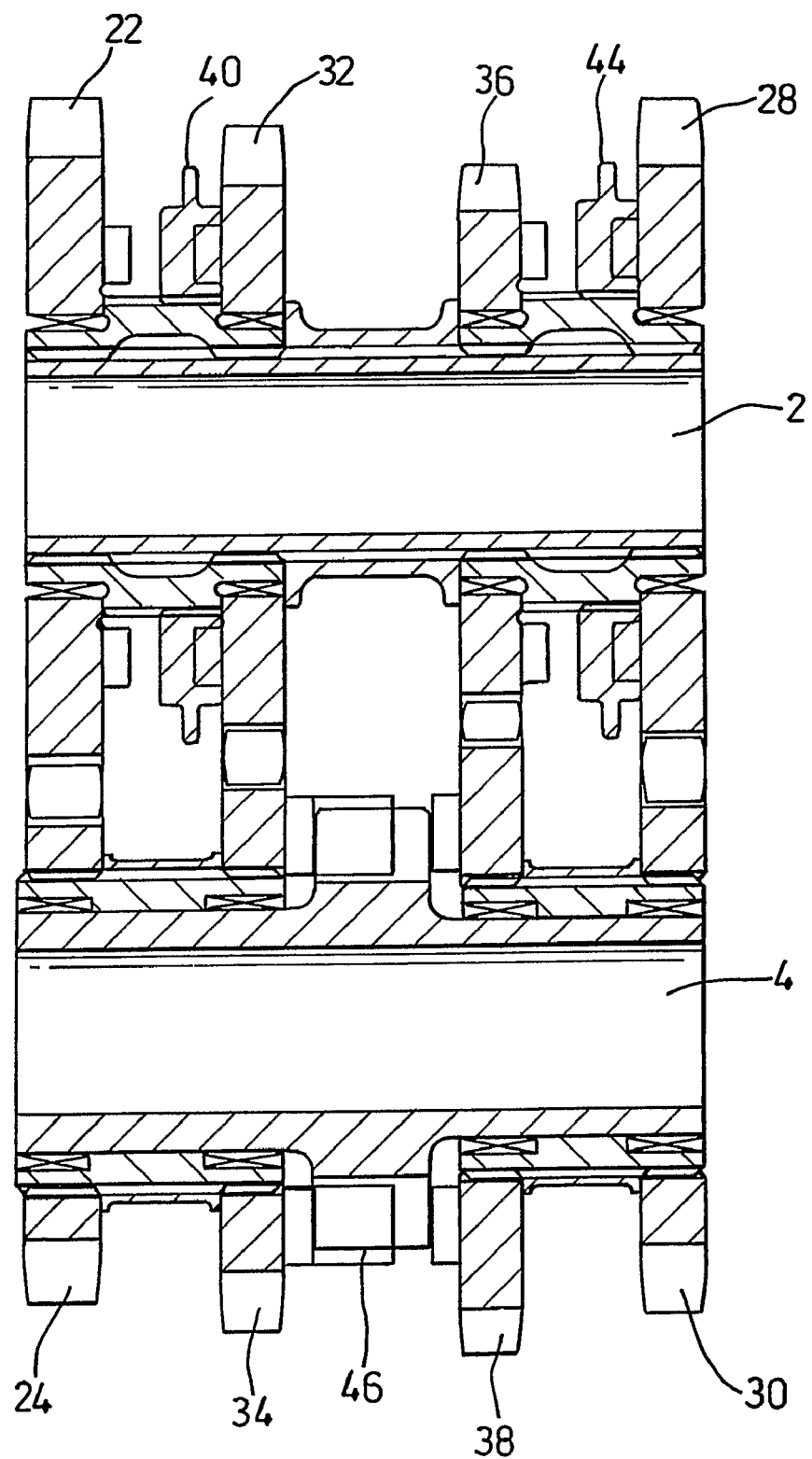
Figure 6F:
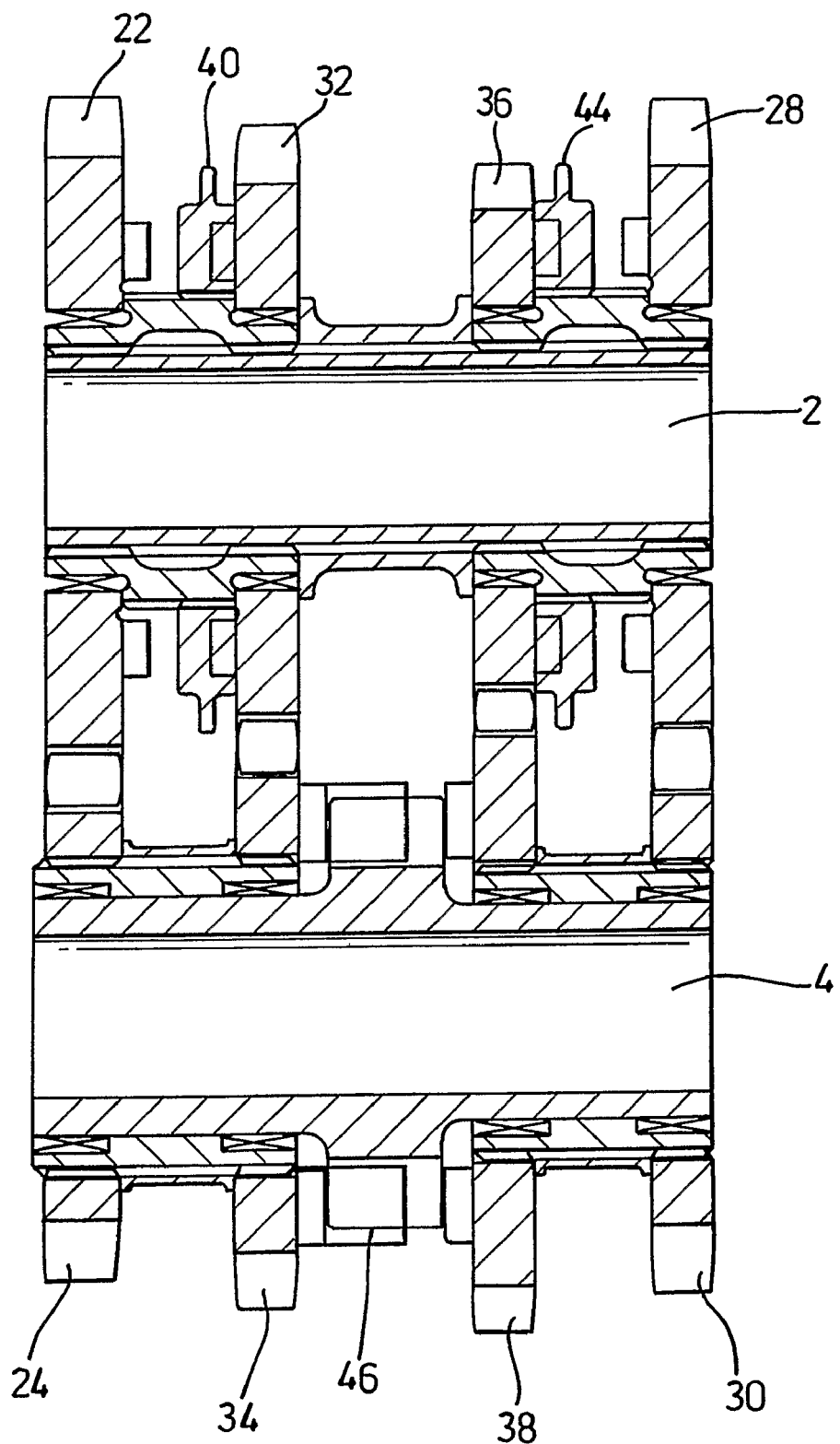
Figure 6G:
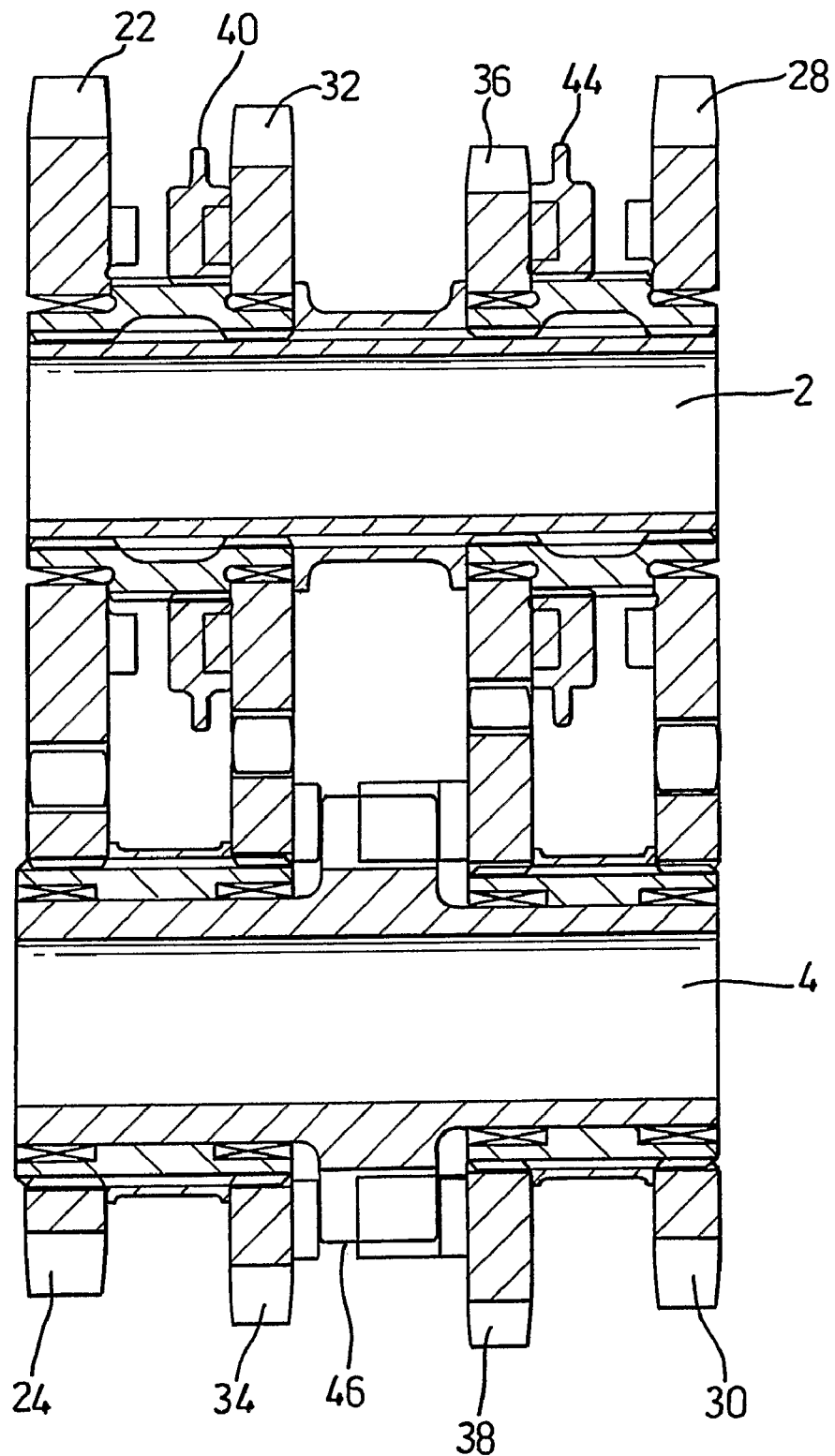

FIG. 5c shows a condition when the sixth gear wheel 34 is fully engaged, that is, the bars 35,37 are interleaved with the first group of dogs 48. The actuator is arranged such that the actuator members maintain the first and second bar sets 35,37 in engagement with the sixth gear wheel 34. Accordingly, drive is transferred through the sixth gear wheel 34 to the output shaft 4 via the first bar set 35 when decelerating and via the second bar set 37 when accelerating.

Whilst accelerating (sixth gear wheel 34 rotating in the direction of arrow B in FIG. 5c), the engagement faces 43 of the bars of the first bar set 35 are not loaded, whilst the engagement faces 43 of the bars of the second bar set 37 are loaded. When a user, or an engine management system (not shown) wishes to engage the eighth gear wheel 38, the actuator is activated causing the frame to move such that the first actuator member causes the bars 35 of the first bar set 35 to slide axially along the keyways 41 in the sleeve thereby disengaging the first bar set 35 from the sixth gear wheel 34 (see FIG. 5d).

Movement of the frame causes the fourth helical spring to act on the second actuator member, which tries to move the second bar set 37 towards the eighth gear wheel 38. However, because the second bar set 37 is loaded, i.e. is driving the first gear wheel 13, it cannot be disengaged from the sixth gear wheel 34, and the second bar set 37 remains stationary, with the resiliency of the fourth helical spring biassing it towards the eighth gear wheel 38.

When the first bar set 35 slides axially along the output shaft 4, the engagement faces engage the second group of dogs 48. The bars 35 then begin to drive the eighth gear wheel 38 in the direction of Arrow C in FIG. 5e. As this occurs, the second bar set 37 ceases to be loaded, and is free to disengage from the first group of dogs 48. Since the second bar set 37 is biased by the fourth helical spring it slides axially along the keyways 41 in the sleeve 59 thereby completing the disengagement of the sixth gear wheel 34 from the output shaft 4. The second bar set 37 slides along the keyways 41 until it engages the eighth gear wheel 38, thereby completing engagement of the eighth gear wheel 38 with the output shaft 4 (see FIG. 5f).

This method of selecting gear trains substantially eliminates torque interruption since the eighth gear wheel 38 is engaged before the sixth gear wheel 34 is disengaged, thus momentarily, the sixth and eighth gear wheels 34,38 are simultaneously engaged and locked for rotation with the output shaft 4, until the newly engaged gear wheel overdrives the original gear wheel.

When a gear wheel is engaged by both the first and second bar sets 35,37 it is possible to accelerate or decelerate using a gear wheel pair with very little backlash occurring when switching between the two conditions. Backlash is the lost motion experienced when the dog moves from the engagement face 43 of the acceleration bar to the engagement face 43 of the deceleration bar when moving from acceleration to deceleration, or vice versa. A conventional dog-type transmission system has approximately 37 degrees of backlash. A typical transmission system for a car in accordance with the current invention has backlash of less than four degrees.

Backlash is reduced by minimising the clearance required between an engagement member and a dog during a gear shift: that is, the clearance between the dog and the following engagement member (see measurement 'A' in FIG. 5b). The clearance between the dog and the following engagement member is in the range 0.5 mm-0.03 mm and is typically less than 0.2 mm. Backlash is also a function of the retention angle, that is, the angle of the engagement face 43, which is the same as the angle of the undercut on the engagement face of the dog 48. The retention angle influences whether there is relative movement between the dog and the engagement face 43. The smaller the retention angle, the less backlash that is experienced. The retention angle is typically between 2.5 and 15 degrees.

Transition from the eighth gear wheel 38 to the sixth gear wheel 34 whilst decelerating is achieved by a similar process. Whilst decelerating the engagement surfaces 51 of the bars of the first bar set 35 are not loaded, whilst the engagement faces 43 of the bars of the second bar set 37 are loaded. When a user, or an engine management system (not shown) wishes to engage sixth gear wheel 34 the actuator is activated to move the frame and hence the first actuator member axially, causing the first bar set 35 to slide axially in the keyways 41 along the output shaft 4 in the direction of the sixth gear wheel 34, thereby disengaging the first bar set 35 from the eighth gear wheel 38.

Axial movement of the frame compresses the third helical spring since the second bar set 37 is loaded and remains stationary, i.e. it is drivingly engaged with the dogs 48 on the eighth gear wheel 38. This biases the second bar set 37 towards the sixth gear wheel 34.

As the first bar set 35 slides axially in the keyways 41 and engages the dogs 48 on the sixth gear wheel 34 and begins to drive the sixth gear wheel 34 such that energy is transmitted between the input and output shafts 2,4. As this occurs, the second bar set 37 ceases to be loaded and the resiliency of the third helical spring causes it to slide axially within the keyways 41 along the output shaft 4 towards the sixth gear wheel 34, thereby completing disengagement of the eighth gear wheel 38. The second bar set 37 continues to slide within the keyways 41 along the output shaft 4 until it engages the sixth gear wheel 34, thereby completing engagement of the sixth gear wheel 34 with the output shaft 3.

Kick-down shifts, that is a gear shift from a higher gear train to a larger gear train but where acceleration takes place, for example when a vehicle is travelling up a hill and the driver selects a lower gear to accelerate up the hill, preferably have a brief torque interruption to allow disengagement prior to the shift.

Use of the instantaneous gear selector mechanism leads to improved performance, lower fuel consumption and lower emissions since drive interruption during gear changes is substantially eliminated. Also the system is a more compact design than conventional gearboxes leading to a reduction in gearbox weight.

Operation of the Transmission

FIG. 1 shows the transmission system in neutral. That is, the first and second selector mechanisms 40,44 are not engaged with either of their respective gear wheels and therefore none of the gear wheels are locked for rotation with the input shaft and thus no drive is being transmitted between the input and output shafts 2,4. The third selector mechanism is initially engaged with the sixth gear wheel 34 and therefore the second and sixth gear wheels 24,34 and the left hand sleeve member 16 are locked for rotation with the output shaft 4.

To select $1^{st}$ gear, a clutch is activated by a user and the first selector mechanism 40 is actuated to engage the first gear wheel 22. This locks the first gear wheel 22 for rotation with the input shaft 2 and drive is transmitted between the shafts 2,4 via $1^{st}$ gear.

To select $2^{nd}$ gear, it is no longer necessary to use the clutch. When the user selects $2^{nd}$ gear the second selector mechanism 44 is actuated to engage the third gear wheel 28. This locks the third gear wheel 28 for rotation with the input shaft 2. Drive continues to be transmitted between the shafts via $1^{st}$ gear at this stage since the fourth gear wheel 37 can rotate with respect to the output shaft 4. The third selector mechanism 46 is then actuated to engage the eighth gear wheel 38. This locks the fourth and eighth gear wheels 37,38 and the right hand sleeve member 18 for rotation with the output shaft 4. Momentarily drive is transmitted between the shafts 2,4 via both the $1^{st}$ and $2^{nd}$ gears until $2^{nd}$ gear over drives $1^{st}$ gear thereby enabling the third selector mechanism 46 to disengage the sixth gear wheel 34. The second and sixth gear wheels 24,34 and the left hand sleeve member 16 are no longer locked for rotation with the output shaft 4 and drive is transmitted between the shafts via $2^{nd}$ gear only.

When the user selects $3^{rd}$ gear the first selector mechanism 40 is actuated to engage the fifth gear wheel 32. This locks the fifth gear wheel 32 for rotation with the input shaft 2. Drive continues to be transmitted between the shafts via $2^{nd}$ gear at this stage since the sixth gear wheel 34 can rotate with respect to the output shaft 4. The third selector mechanism 46 is then actuated to engage the sixth gear wheel 34. This locks the second and sixth gear wheels 24,34 and the left hand sleeve member 16 for rotation with the output shaft 4. Momentarily drive is transmitted between the shafts 2,4 via both $2^{nd}$ and $3^{rd}$ gears until $3^{rd}$ gear over drives $2^{nd}$ gear and the third selector mechanism 46 disengages the eighth gear wheel 38. The fourth and eighth gear wheels 37,38 and the right hand sleeve member 18 are no longer locked for rotation with the output shaft 4 and drive is transmitted between the shafts via $3^{rd}$ gear only.

When the user selects $4^{th}$ gear the second selector mechanism 44 is actuated to engage the seventh gear wheel 36. This locks the seventh gear wheel 36 for rotation with the input shaft 2. Drive continues to be transmitted between the shafts via $3^{rd}$ gear at this stage since the eighth gear wheel 38 can rotate with respect to the output shaft 4. The third selector mechanism 46 is then actuated to engage the eighth gear wheel 38 whilst still engaging the sixth gear wheel 34. This locks the fourth and eighth gear wheels 37,38 and the right hand sleeve member 18 for rotation with the output shaft 4. Momentarily drive is transmitted between the shafts 2,4 via both $3^{rd}$ and $4^{th}$ gears until $4^{th}$ gear over drives $3^{rd}$ gear and the third selector mechanism 46 disengages the sixth gear wheel 34. The second and sixth gear wheels 24,34 and the left hand sleeve member 16 are no longer locked for rotation with the output shaft 4 and drive is transmitted between the shafts via $4^{th}$ gear only.

Lower gears can be selected by following a similar procedure.

Thus when a new gear is selected the first and second selector mechanisms 40,44 are arranged to pre-select their respective gear wheels and lock them for rotation with the input shaft 2 before the third selector mechanism 46 is operated to lock the gear wheels 24,34 of the odd gears ($1^{st}$ and $3^{rd}$) or the gear wheels 37,38 of the even gears ($2^{nd}$ and $4^{th}$) for rotation with the output shaft 4.

Second Embodiment

A second embodiment of the invention is shown in FIGS. 7a-g. The transmission includes an input shaft 102, an output shaft 104 and six gear ratios ($1^{st}$, $2^{nd}$, $3^{rd}$, $4^{th}$, $5^{th}$ and $6^{th}$ gears) for transmitting drive between the input and output shafts 102,104. The gear ratios are arranged such that odd gear ratios are on the right hand side of the transmission and the even gear ratios are on the left hand side. In the arrangement shown in FIG. 7a the gears are arranged in the order $2^{nd}$, $6^{th}$, $4^{th}$, $3^{rd}$, $5^{th}$, $1^{st}$ from left to right.

The transmission includes first and second sleeve members 116,118, hereinafter referred to as the left and right hand sleeve members, that are mounted on the output shaft 104 via bearings such that they can rotate relative to the output shaft 104 independently of each other.

The $1^{st}$ gear ratio ($1^{st}$ gear) comprises first and second gear wheels 122,124. The first gear wheel 122 is mounted on the right hand sleeve member 118 towards one end via a bearing 126, the arrangement being such that the first gear wheel 122 can rotate relative to the right hand sleeve member 118 and hence the output shaft 2. The second gear wheel 124 is mounted on the input shaft 102 towards one end and is locked for rotation therewith by a splined arrangement.

The $2^{nd}$ gear ratio ($2^{nd}$ gear) comprises third and fourth gear wheels 128, 130. The third gear wheel 128 is mounted on the left hand sleeve member 116 towards one end via a bearing 126, the arrangement being such that the third gear wheel 128 can rotate relative to the left hand sleeve member 116 and hence the input shaft 2. The fourth gear wheel 130 is mounted on input shaft 102 and is locked for rotation therewith by a splined arrangement.

The $3^{rd}$ gear ratio ($3^{rd}$ gear) comprises fifth and sixth gear wheels 132,134. The fifth gear wheel 132 is mounted on the right hand sleeve member 118 via a bearing 126 and is located towards the opposite end to that carrying the first gear wheel 122, the arrangement being such that the fifth gear wheel 132 can rotate relative to the right hand sleeve member 118 and hence the output shaft 104. The sixth gear wheel 134 is mounted on the input shaft 102 and is locked for rotation therewith by a splined arrangement.

The $4^{th}$ gear ratio ($4^{th}$ gear) comprises seventh and eighth gear wheels 136,138. The seventh gear wheel 138 is mounted on the left hand sleeve member 116 via a bearing 126 and is located towards the opposite end to that carrying the third gear wheel 122, the arrangement being such that the seventh gear wheel 138 can rotate relative to the left hand sleeve member and hence the output shaft 104. The eighth gear wheel 138 is mounted on the input shaft 102 and is locked for rotation therewith by a splined arrangement.

The $5^{th}$ gear ratio ($5^{th}$ gear) comprises ninth and tenth gear wheels 139,141. The ninth gear wheel 139 is mounted on the right hand sleeve member 118 between the first and fifth gear wheels 122,132 and is locked for rotation with the right hand sleeve member 118 by a splined arrangement. The tenth gear wheel 141 is rotatably mounted on the input shaft 102 by a bearing 126 and is located between second and sixth gear wheels 124,134.

The $6^{th}$ gear ratio ($6^{th}$ gear) comprises eleventh and twelfth gear wheels 143,145. The eleventh gear wheel 143 is mounted on the left hand sleeve member 116 between the third and seventh gear wheels 128,136 and is locked for rotation with the left hand sleeve member 116 by a splined arrangement. The twelfth gear wheel 145 is rotatably mounted on the input shaft 102 by a bearing 126 and is located between fourth and eight gear wheels 130,138.

The transmission includes a first selector mechanism 140. The first selector mechanism 140 is a conventional dog type engagement system that includes engagement members 147 located on a first side of the sixth gear wheel 134 for selectively engaging drive formations (dogs) 151 on the tenth gear wheel 141, thereby selectively locking the tenth gear wheel 141 for rotation with the input shaft 102. The sixth gear wheel 134 is arranged to slide along the input shaft 102 so that it can move into and out of engagement with the tenth gear wheel 141. Movement of the sixth gear wheel 134 is controlled by an actuator 149. The movement is limited to ensure that the sixth gear wheel 134 remains in mesh with the fifth gear wheel 132.

The transmission includes a second selector mechanism 144. The second selector mechanism 144 is a dog type engagement system that includes engagement members 147 located on a first side of the eighth gear wheel 138 for selectively engaging drive formations (dogs) 151 on the twelfth gear wheel 145, thereby selectively locking the twelfth gear wheel 145 for rotation with the input shaft 102. The eighth gear wheel 138 is arranged to slide along the input shaft 102 so that it can move into and out of engagement with the twelfth gear wheel 145. Movement of the eighth gear wheel 138 is controlled by an actuator 151. The movement is limited to ensure that the eighth gear wheel 138 remains in mesh with the seventh gear wheel 130.

A third selector mechanism 146 is mounted on the output shaft 104 between the fifth and seventh gear wheels 132, 136. The third selector mechanism 146 is of the instantaneous type described above for the first embodiment. The third selector mechanism 146 is arranged to selectively engage drive formations 148 on the left and right hand sleeve members 116, 118 to lock the sleeve members for rotation with the output shaft 104. The third selector mechanism is arranged to simultaneously engage the left and right hand sleeve members 116,118, at least momentarily, thereby enabling gearshifts to take place without loss of drive.

When the right hand sleeve member 118 is locked for rotation with the output shaft 104 the ninth gear wheel 139 is also locked for rotation with the output shaft 104, however the first and fifth gear wheels 122,132 can rotate relative to the output shaft 104. When the left hand sleeve member 116 is locked for rotation with the output shaft 104 the eleventh gear wheel 143 is also locked for rotation with the output shaft 104, however the third and seventh gear wheels 128,136 can rotate relative to the output shaft 104.

The transmission includes a fourth selector mechanism 153. The fourth selector mechanism 153 is a dog type engagement system that includes engagement members 147 located on first and second sides of the ninth gear wheel 139 for selectively engaging drive formations (dogs) 151 on the first gear wheel 122 and on the fifth gear wheel 132, thereby selectively locking the first and fifth gear wheels 122,132 for rotation with the right hand sleeve member 118. The ninth gear wheel 139 is arranged to slide along the right hand sleeve member 118 so that it can move into and out of engagement with the first and fifth gear wheels 122,132. Movement of the ninth gear wheel 139 is controlled by an actuator 155. The movement is limited to ensure that the ninth gear wheel 139 remains in mesh with the tenth gear wheel 141.

The transmission includes a fifth selector mechanism 157. The fifth selector mechanism 157 is a dog type engagement system that includes engagement members 147 located on first and second sides of the eleventh gear wheel 139 for selectively engaging drive formations (dogs) 151 on the third and seventh gear wheels 128,136, thereby selectively locking the third and seventh gear wheels 128,136 for rotation with the left hand sleeve member 116. The eleventh gear wheel 143 is arranged to slide along the left hand sleeve member 116 so that it can move into and out of engagement with the third and seventh gear wheels 128,136. Movement of the eleventh gear wheel 143 is controlled by an actuator 159. The movement is limited to ensure that the eleventh gear wheel 143 remains in mesh with the twelfth gear wheel 145.

Drive is transmitted between the input and output shafts 2,4 via a particular gear ratio when both gear wheels of the ratio are locked for rotation with their respective shafts. Furthermore, the transmission layout enables all sequential gearshifts to take place without interruption of drive even though only one selector mechanism of the instantaneous type is used in the transmission layout. This will be become apparent from the description of the operation of the transmission below.

Operation of the Transmission

Figure 7A:
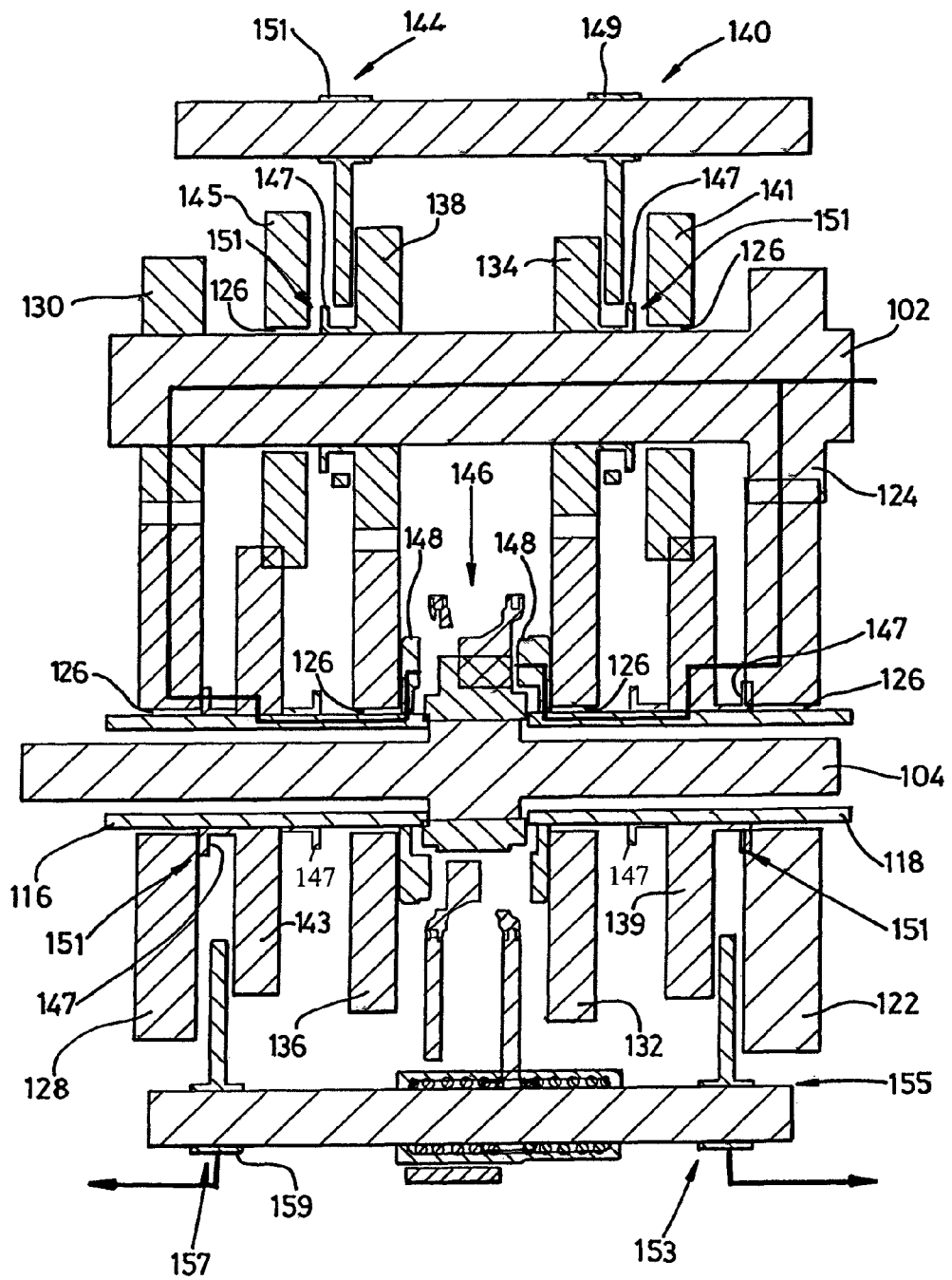
FIGS. 7$a$-$g$ show a sequence of movements of selector assemblies for a second embodiment moving from neutral through to sixth gear sequentially.
Figure 7B:
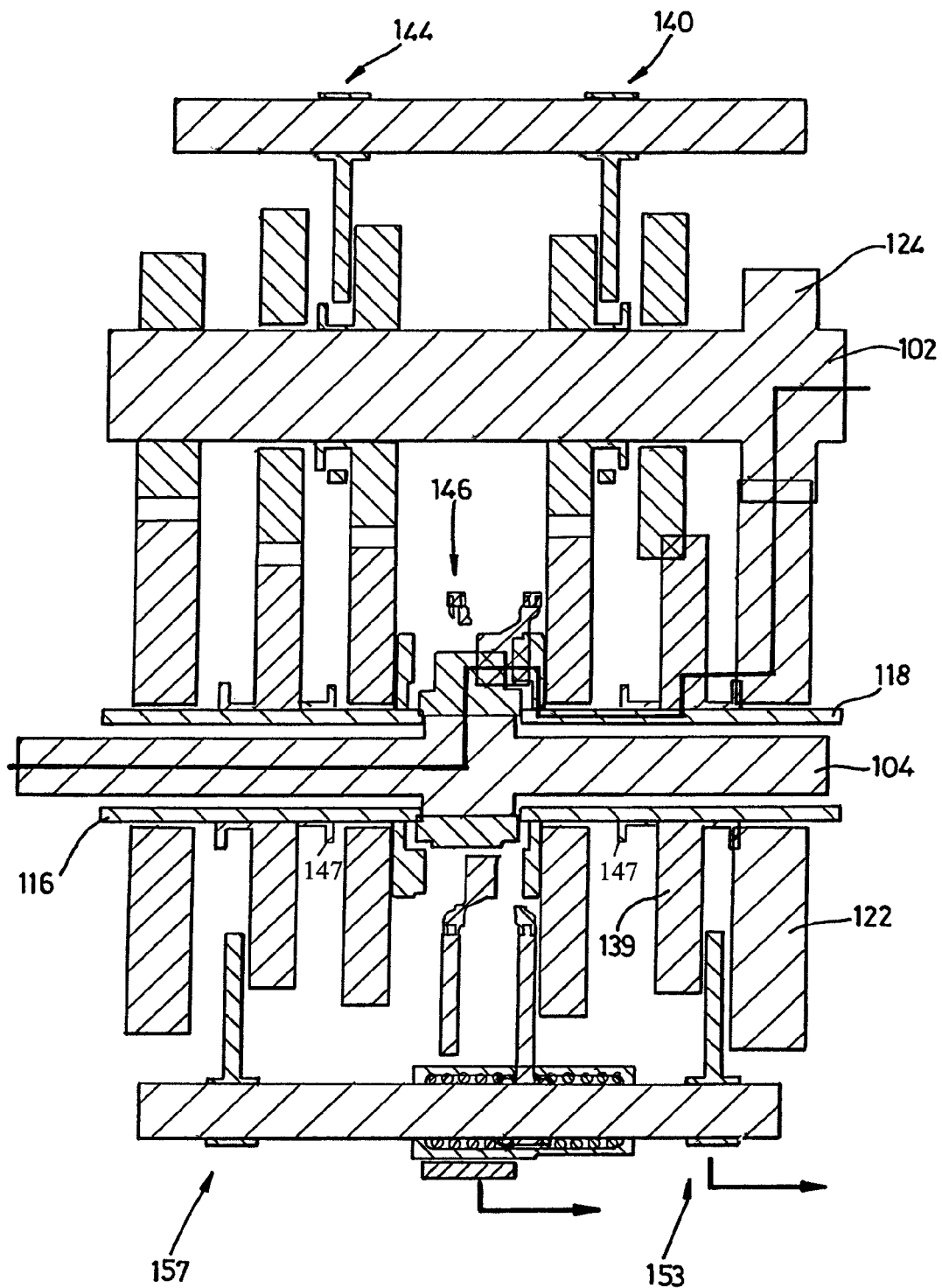
Figure 7C:
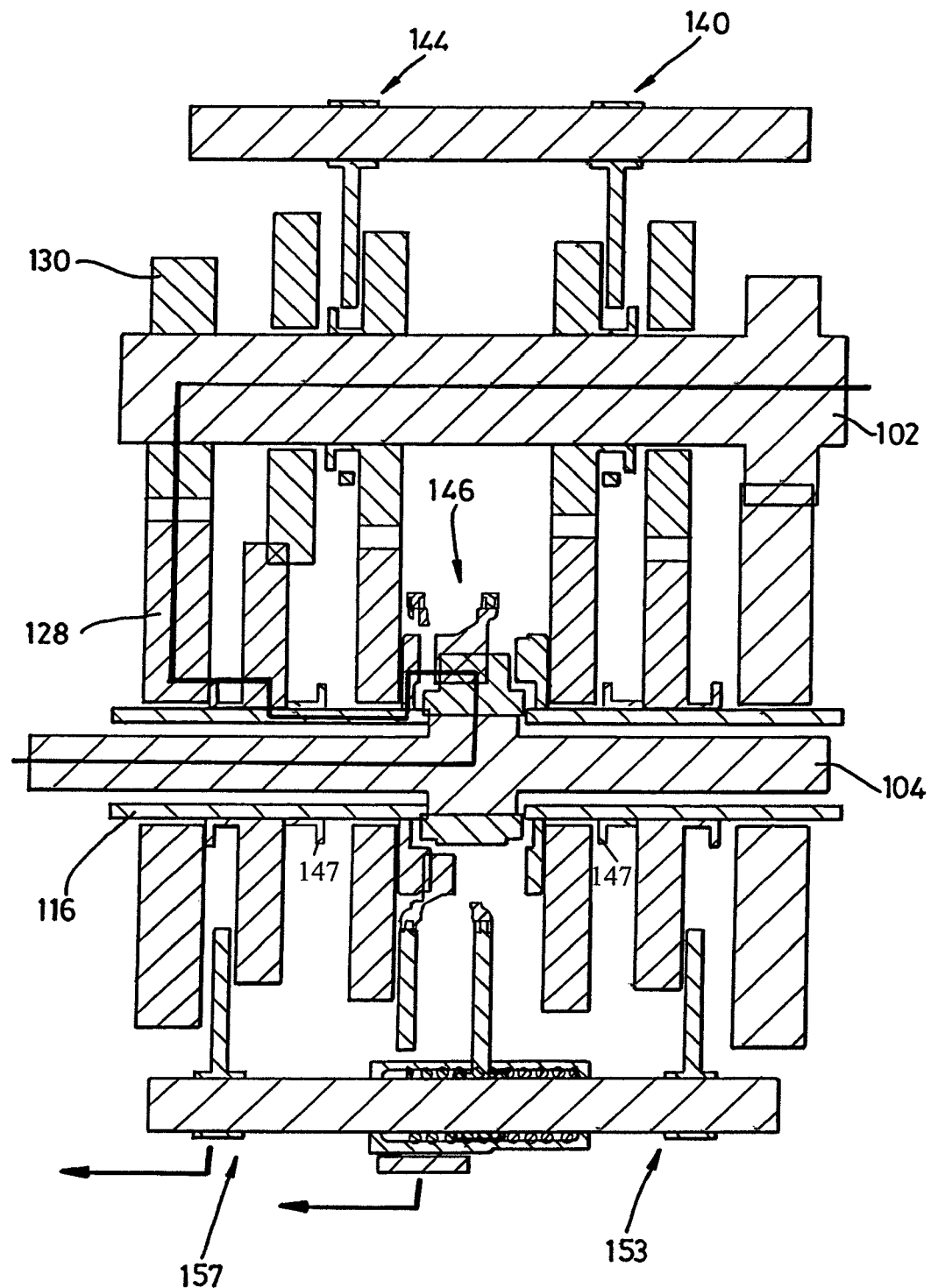
Figure 7D:
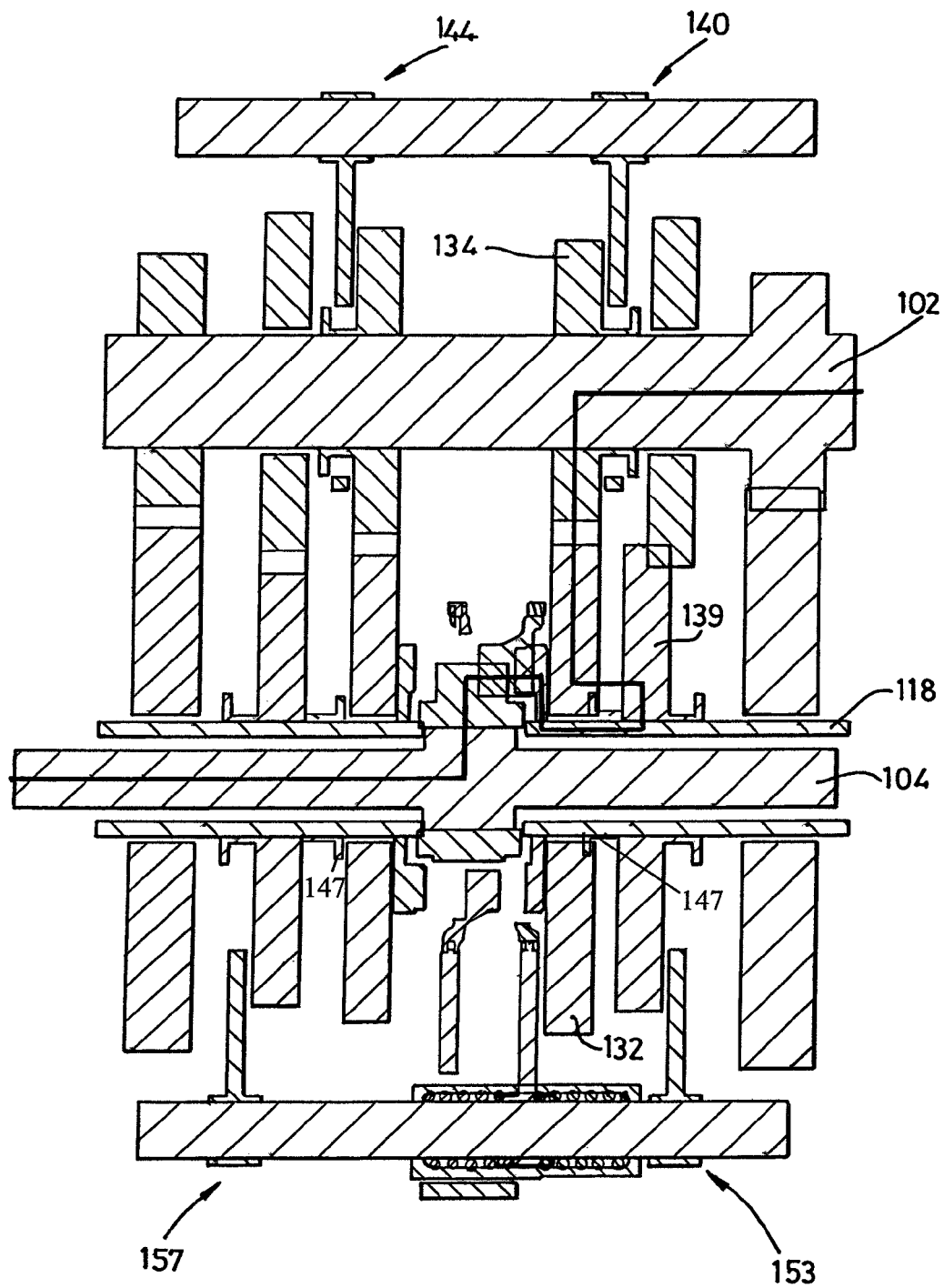
Figure 7E:
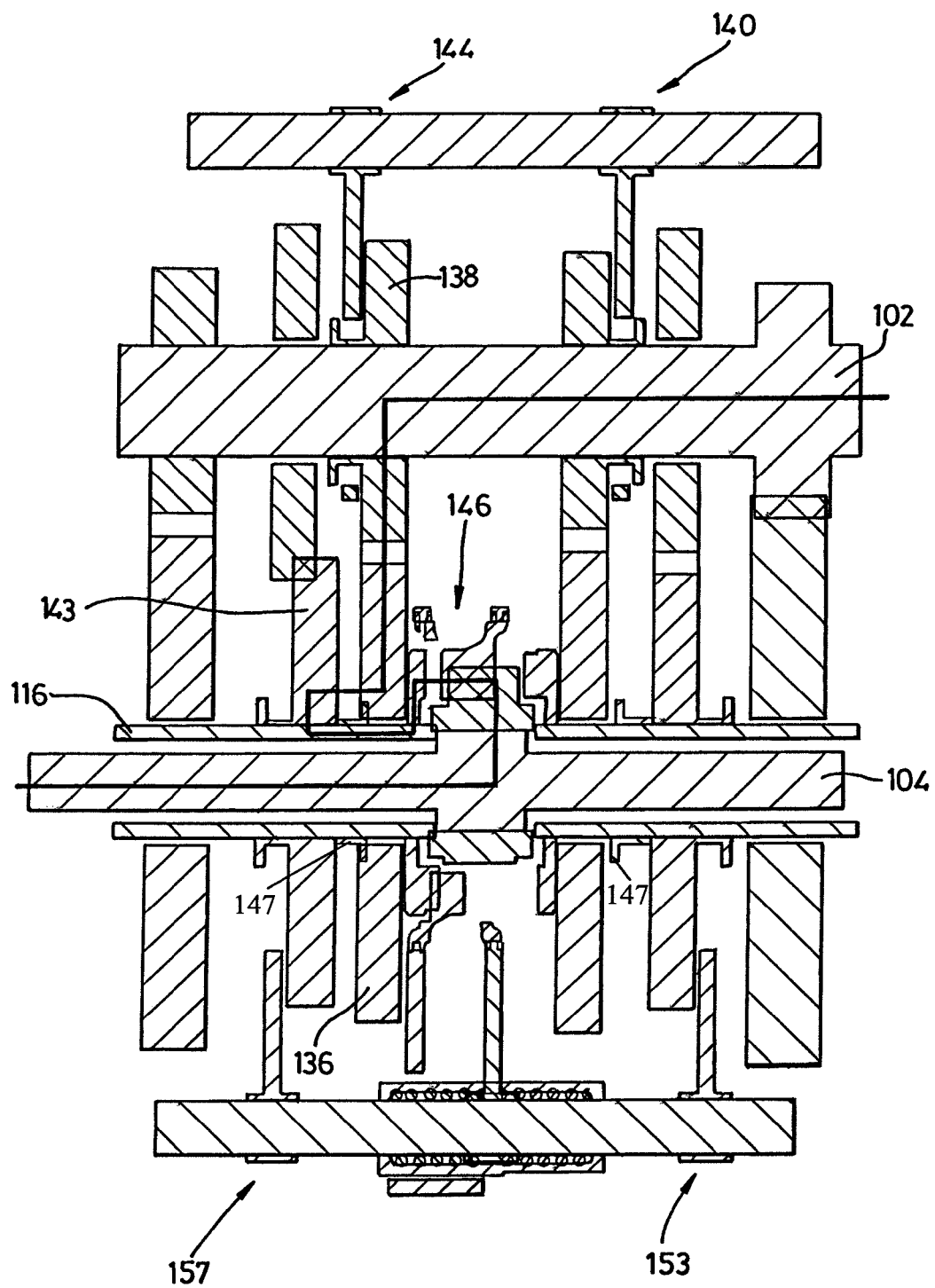
Figure 7F:
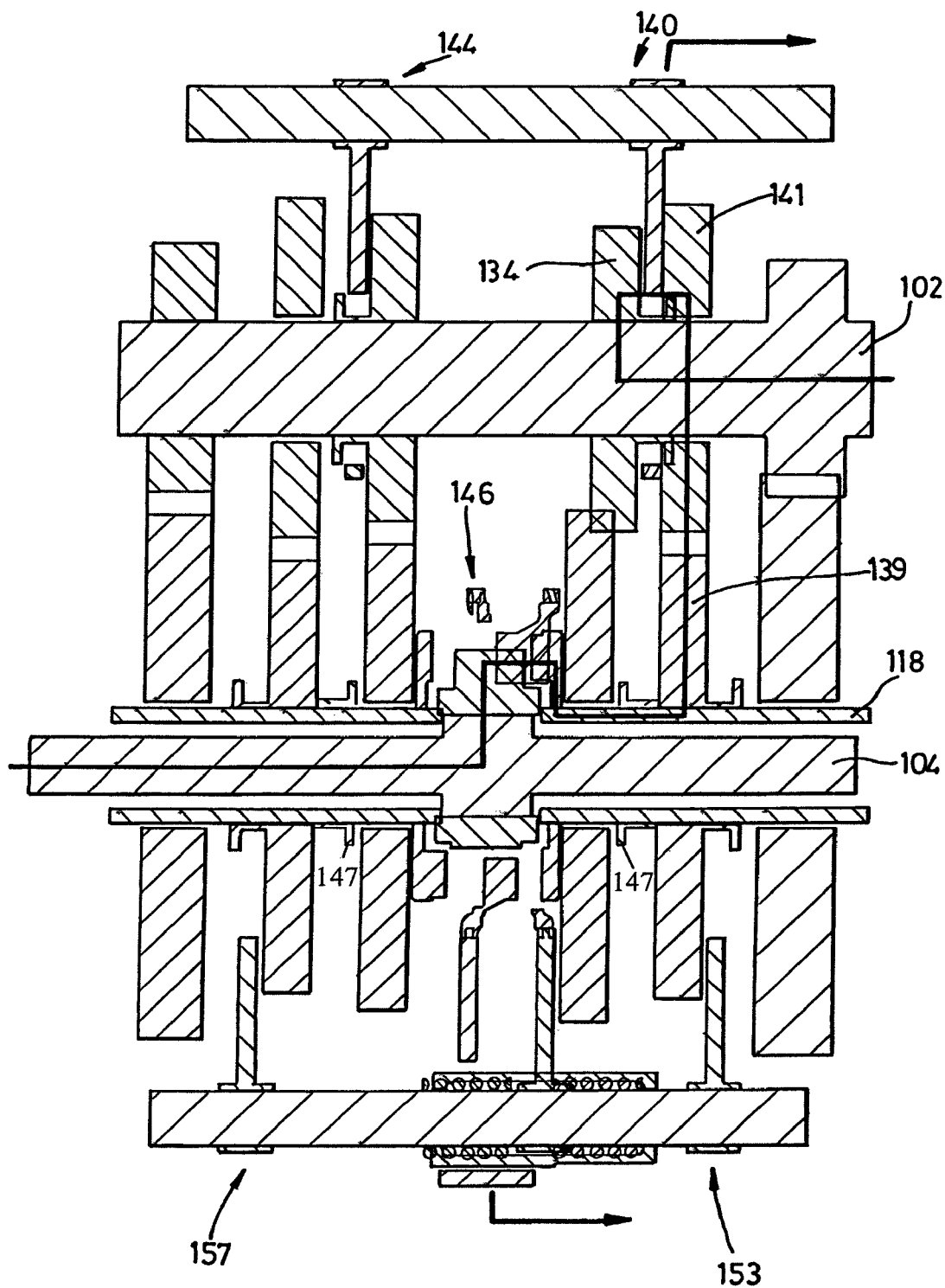
Figure 7G:
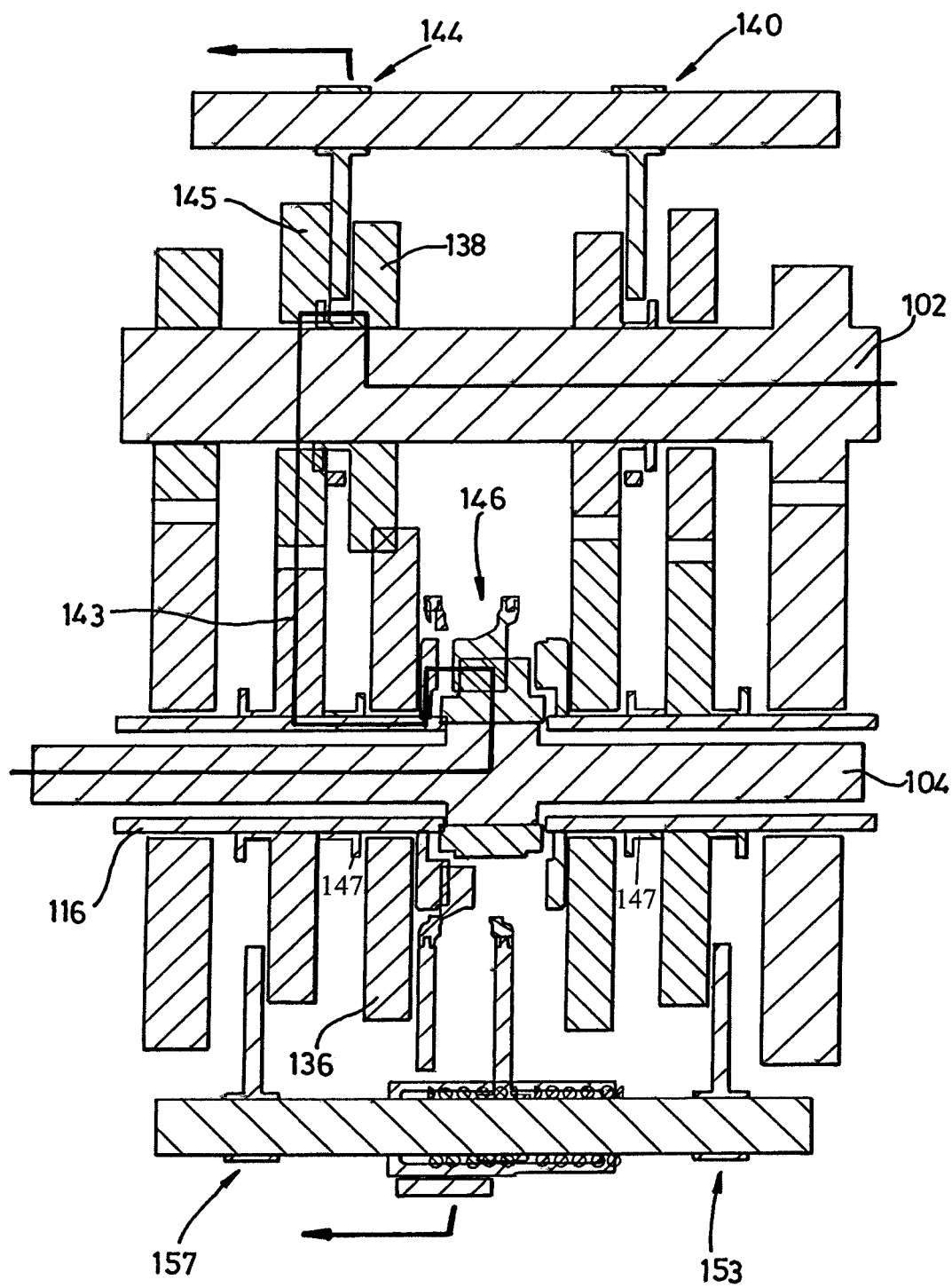

FIG. 7a shows the transmission system in neutral. That is, the first and second selector mechanisms 140,144 are not engaged with either of their respective gear wheels, the third selector mechanism is not in engagement with either of the sleeves 116,118, the fourth selector mechanism 153 is in engagement with the first gear wheel 122 and the fifth selector mechanism is in engagement with the third gear wheel 128, and therefore no torque is transmitted between the input and output shafts 102,104.

To select $1^{st}$ gear, the user activates a clutch and the third selector mechanism 146 engages the right hand sleeve member 118 and the fifth selector mechanism 157 disengages the third gear wheel 128. Torque is then transmitted between the input and output shafts 102,104 via the first and second gear wheels 122,124, the fourth selector mechanism 153, the right hand sleeve member 118 and the third selector mechanism 146.

To select $2^{nd}$ gear, it is no longer necessary to use the clutch. When a user (or engine management system) selects $2^{nd}$ gear the fifth selector mechanism 157 is actuated to engage the third gear wheel 128. Since the third selector mechanism 146 fully engages the right hand sleeve member 118 no torque is transmitted via the second gear ratio at this time. After the third gear wheel 128 has been selected by the fifth selector mechanism 157 the third selector mechanism 146 is actuated to engage the left hand sleeve member 116. When the left hand sleeve member 116 is engaged, momentarily torque is transmitted between the input and the output shafts 102,104 via first and second gears. Very quickly, second gear over drives first gear and the trailing engagement bars disengage from the right hand sleeve member 118 and move into contact with the left hand sleeve member 116 thus completing the gear change. Torque is transmitted between the input and output shafts 102,104 via the third and fourth gear wheels 128, 130, the fifth selector mechanism 157, the left hand sleeve member 116 and the third selector mechanism 146. The fourth selector mechanism 153 is actuated to disengage it from the first gear wheel 122.

When a user selects $3^{rd}$ gear the fourth selector mechanism 153 is actuated to engage the fifth gear wheel 132. Since the third selector mechanism 146 fully engages the left hand sleeve member 116 no torque is transmitted via the third gear ratio at this time. After the third gear wheel 128 has been selected the third selector mechanism 146 is actuated to engage the right hand sleeve member 118. When the right hand sleeve member 118 is engaged, momentarily torque is transmitted between the input and the output shafts 102,104 via second and third gears. Very quickly, third gear over drives second gear and the trailing engagement bars disengage from the left hand sleeve member 118 and move into contact with the right hand sleeve member 118 thus completing the gear change. Torque is transmitted between the input and output shafts 102,104 via the fifth and sixth gear wheels 132,134, the fourth selector mechanism 153, the right hand sleeve member 118 and the third selector mechanism 146. The fifth selector mechanism 157 is actuated to disengage it from the third gear wheel 128.

When the user selects $4^{th}$ gear the fifth selector mechanism 157 is actuated to engage the seventh gear wheel 130. Since the third selector mechanism 146 fully engages the right hand sleeve member 118 no torque is transmitted via the fourth gear ratio at this time. After the seventh gear wheel 138 has been selected the third selector mechanism 146 is actuated to engage the left hand sleeve member 116. When the left hand sleeve member 116 is engaged, momentarily torque is transmitted between the input and the output shafts 102,104 via third and fourth gears. Very quickly, fourth gear over drives third gear and the trailing engagement bars disengage from the right hand sleeve member 118 and move into contact with the left hand sleeve member 116 thus completing the gear change. Torque is transmitted between the input and output shafts 102,104 via the seventh and eighth gear wheels 136, 138, the fifth selector mechanism 157, the left hand sleeve member 116 and the third selector mechanism 146. The fourth selector mechanism 153 is actuated to disengage it from the fifth gear wheel 132.

When the user selects $5^{th}$ gear the first selector mechanism 140 is actuated to engage the tenth gear wheel 141. Since the third selector mechanism 146 fully engages the left hand sleeve member 116 no torque is transmitted via the fifth gear ratio at this time. After the tenth gear wheel 141 has been selected the third selector mechanism 146 is actuated to engage the right hand sleeve member 118. When the right hand sleeve member 118 is engaged, momentarily torque is transmitted between the input and the output shafts 102,104 via fourth and fifth gears. Very quickly, fifth gear over drives fourth gear and the trailing engagement bars disengage from the left hand sleeve member 116 and move into contact with the right hand sleeve member 118 thus completing the gear change. Torque is transmitted between the input and output shafts 102,104 via the first selector mechanism 140, the ninth and tenth gear wheels 139,141, the right hand sleeve member 118 and the third selector mechanism 146. The fifth selector mechanism 153 is actuated to disengage it from the seventh gear wheel 136.

When the user selects $6^{th}$ gear the second selector mechanism 144 is actuated to engage the twelfth gear wheel 145. Since the third selector mechanism 146 fully engages the right hand sleeve member 118 no torque is transmitted via the sixth gear ratio at this time. After the twelfth gear wheel 145 has been selected the third selector mechanism 146 is actuated to engage the left hand sleeve member 116. When the left hand sleeve member 116 is engaged, momentarily torque is transmitted between the input and the output shafts 102,104 via fifth and sixth gears. Very quickly, sixth gear over drives fifth gear and the trailing engagement bars disengage from the right hand sleeve member 118 and move into contact with the left hand sleeve member 116 thus completing the gear change. Torque is transmitted between the input and output shafts 102,104 via the second selector mechanism 144, the eleventh and twelfth gear wheels, the left hand sleeve member 116 and the third selector mechanism 146. The first selector mechanism 140 is actuated to disengage it from the tenth gear wheel 141.

Lower gears can be selected by following a similar procedure.

Thus when a new gear is selected the first, second, fourth and fifth selector mechanisms 140,144,153,157 are arranged to pre-select their respective gear wheels before the third selector mechanism 146 is operated.

It will be appreciated by the skilled person that modifications can be made to the above embodiment that are within the scope of the invention. For example, the positions of the gears ($1^{st}$, $2^{nd}$, $3^{rd}$ and $4^{th}$) can be different, provided that the odd and even gears are separated. For example, the odd gears could be mounted on the right hand side and the even gears on the left hand side. The positions of $1^{st}$ and $3^{rd}$ gears can be swapped and the positions of $2^{nd}$ and $4^{th}$ gears can be swapped.

The transmission layout can be used with any practicable number of gear ratios, for example two to eight gear ratios. An additional conventional selector mechanism would be required to select the gear wheel located on the input shaft for a five-gear transmission and two additional conventional selector mechanisms required for a six to eight gear transmission.

The components mounted on the input shaft 2 could be mounted on the output shaft 4 and vice versa.

The transmission can include more than two shafts, for example to allow the input shaft and the output shaft to be arranged substantially co-axial. A third shaft can be arranged in parallel to the input and output shafts and drive can be transmitted to the output shaft via the third shaft.

Instantaneous gear selector devices that use separate actuators for controlling each set of engagement members can also be used.

If synchromesh type selector mechanisms are used in the second embodiment instead of the dog type selector mechanism, then it is not necessary for the gear wheels to slide into engagement.

The invention claimed is:

1. A transmission system including:
   first and second shafts;
   a plurality of gear trains arranged to transfer drive between the first and second shafts;
   an instantaneous selector mechanism; and
   at least one non-instantaneous selector mechanism, wherein the instantaneous selector mechanism and the at least one non-instantaneous selector mechanism are arranged to create torque paths between the first and second shafts via the gear trains, wherein each gear train is selectable when another gear train is transmitting torque, wherein the plurality of gear trains includes odd and even gears that are arranged such that the odd gears are arranged on one side of the instantaneous selector mechanism and the even gears are arranged on the other side of the instantaneous selector mechanism.

2. A transmission system according to claim 1, wherein the at least one non-instantaneous selector mechanism is arranged to select a gear train prior to selection by the instantaneous selector mechanism.

3. A transmission system including:
   a first shaft;
   a first body rotatably mounted on the first shaft;
   a first gear train having a first gear element arranged to be driven by the first body;
   a second gear train having a second gear element arranged to be driven by the first body;
   a second body rotatably mounted on the first shaft;
   a third gear train having a fifth gear element arranged to be driven by the second body;
   a fourth gear train having a sixth gear element arranged to be driven by the second body; and
   a first selector mechanism arranged to selectively lock the first and second bodies for rotation with the first shaft;
   wherein the first selector mechanism is arranged to select between the following four modes of operation with respect to each of the first and second bodies: fully engaged in both torque directions; disengaged in both torque directions; engaged in the forward torque direction while disengaged in the reverse torque direction; and disengaged in the forward toque direction while engaged in the reverse torque direction.

4. A transmission system according to claim 3, wherein the first body includes a sleeve member, wherein the sleeve member is mounted on the first shaft on bearings.

5. A transmission system according to claim 3, wherein the first body includes engagement formations arranged for engagement with the first selector mechanism.

6. A transmission system according to claim 3, further including a second shaft and a second selector mechanism, wherein the first gear train further includes a third gear element mounted on the second shaft and the second gear train further includes a fourth gear element mounted on the second shaft, wherein the first and second selector mechanisms are arranged to selectively transmit torque between the first and second shafts via the first and second gear trains.

7. A transmission system according to claim 3, wherein the second body further comprises a sleeve member, wherein the sleeve member is mounted on the first shaft on bearings.

8. A transmission system according to claim 3, wherein the second body further includes engagement formations arranged for engagement with the first selector mechanism.

9. A transmission system according to claim 3, further including a third selector mechanism, wherein the third gear train includes a seventh gear element mounted on a second shaft and the fourth gear train includes an eighth gear element mounted on the second shaft, wherein the first and third selector mechanisms are arranged to selectively transmit torque between the first and second shafts via the third and fourth gear trains.

10. A transmission system according claim 6, wherein the first and second gear elements are fixed for rotation with the first body, the third and fourth gear elements are rotatably mounted on the second shaft, and the second selector mechanism is arranged to selectively lock the third and fourth gear elements for rotation with the second shaft.

11. A transmission system according to claim 10, wherein the second selector mechanism is arranged to lock the third gear element for rotation with the second shaft before the first selector mechanism locks the first body for rotation with the first shaft during a gearshift.

12. A transmission system according to claim 10, wherein the second selector mechanism is arranged to lock the fourth gear element for rotation with the second shaft before the first selector mechanism locks the first body for rotation with the first shaft during a gearshift.

13. A transmission system according to claim 9, wherein the fifth and sixth gear elements are fixed for rotation with the second body, the seventh and eighth gear elements are rotatably mounted on the second shaft, and the third selector mechanism is arranged to selectively lock the seventh and eight gear elements for rotation with the second shaft.

14. A transmission system according to claim 13, wherein the third selector mechanism is arranged to lock the seventh gear element for rotation with the second shaft before the first selector mechanism locks the second body for rotation with the first shaft during a gearshift.

15. A transmission system according to claim 13, wherein the third selector mechanism is arranged to lock the eighth gear element for rotation with the second shaft before the first selector mechanism locks the second body for rotation with the first shaft during a gearshift.

16. A transmission system according to claim 6, wherein alternate gear trains on each side of the first selector device have opposite rotatably mounted and fixed gear elements.

17. A transmission system according to claim 16, wherein the first gear element is rotatably mounted on the first body, the second gear element is locked for rotation with the first body, the third gear element is locked for rotation with the second shaft, the fourth gear element is rotatably mounted on the second shaft, and the second selector mechanism is arranged to selectively lock the fourth gear element for rotation with the second shaft.

18. A transmission system according to claim 17, wherein the second selector mechanism further includes an actuator and engagement members formed or mounted on the third gear element, wherein the third gear element is arranged for axial movement along the second shaft.

19. A transmission system according to claim 16, further including a fourth selector mechanism arranged to selectively lock the first gear element for rotation with the first body.

20. A transmission system according to claim 19, wherein the fourth selector mechanism further includes an actuator and engagement members formed or mounted on the second gear element, wherein the second gear element is arranged for axial movement along the first body.

21. A transmission system according to claim 20, further including a fifth gear train including a ninth gear element rotatably mounted on the first body and a tenth gear element fixed for rotation with the first shaft, wherein the fourth selector mechanism is arranged to selectively lock the ninth gear element for rotation with the first body.

22. A transmission system according to claim 16, wherein the fifth gear element is rotatably mounted on the second body, the sixth gear element is locked for rotation with the second body, the seventh gear element is locked for rotation with the second shaft, the eighth gear element is rotatably mounted on the second shaft, and the third selector mechanism is arranged to selectively lock the eighth gear element for rotation with the second shaft.

23. A transmission system according to claim 22, wherein the third selector mechanism further includes an actuator and engagement members formed or mounted on the seventh gear element, wherein the seventh gear element is arranged for axial movement along the second shaft.

24. A transmission system according to claim 22, further including a fifth selector mechanism arranged to selectively lock the fifth gear element for rotation with the second body.

25. A transmission system according to claim 24, wherein the fifth selector mechanism further includes an actuator and engagement members formed or mounted on the sixth gear element, wherein the sixth gear element is arranged for axial movement along the second body.

26. A transmission system according to claim 25 further including a sixth gear train further including an eleventh gear element rotatably mounted on the second body and a twelfth gear element fixed for rotation with the second shaft, wherein the fifth selector mechanism is arranged to selectively lock the eleventh gear element for rotation with the second body.

27. A transmission system according to claim 3, wherein the first selector mechanism further includes first and second sets of engagement members.

28. A transmission system according to claim 27, wherein the first selector mechanism is arranged such that when a braking force is transmitted the first set of engagement members drivingly engages the first body, and the second set of engagement members is in an unloaded condition, and when a driving force is transmitted the second set of engagement members drivingly engages the first body, and the second set of engagement members is then in an unloaded condition.

29. A transmission system according to claim 27, wherein the first selector mechanism is arranged such that when a braking force is transmitted the second set of engagement members drivingly engages the second body, and the first set of engagement members is in an unloaded condition, and when a driving force is transmitted the first set of engagement members drivingly engages the second body, and the first set of engagement members is then in an unloaded condition.

30. A transmission system according to claim 27, wherein the first selector mechanism is arranged to bias a set of engagement members drivingly engaged with the first body out of engagement with the first body without disengaging the loaded set of engagement members from the first body.

31. A transmission system according to claim 27, wherein the first selector mechanism is arranged to bias a set of engagement members drivingly engaged with the second body towards the first body without disengaging the loaded set of engagement members from the second body.

32. A method of transmitting drive between first and second shafts via a gear train, said method comprising: providing a transmission including an instantaneous selector mechanism, a non-instantaneous selector mechanism, a first gear train comprising first and second gear elements, a second gear train comprising third and fourth gear elements, and a body that is rotatably mounted on the first shaft; wherein the first and third gear elements are mounted on the body and the instantaneous selector mechanism is arranged to selectively lock the body for rotation with the first shaft from operational modes that include the following modes: fully engaged in both torque directions; disengaged in both torque directions; engaged in the forward torque direction while disengaged in the reverse torque direction; and disengaged in the forward torque direction while engaged in the reverse torque direction; and wherein at least one of the second and fourth gear elements is rotatably mounted on the second shaft and the non-instantaneous selector mechanism is arranged to selectively lock at least one of the second and fourth gear elements for rotation with the second shaft; the method further including selecting one of the first and second gear trains with the non-instantaneous selector mechanism and subsequently selecting the body with the instantaneous selector mechanism.

33. A transmission system including:
a first shaft;
a first body rotatably mounted on the first shaft;
a first gear train having a first gear element arranged to be driven by the first body;
a second gear train having a second gear element arranged to be driven by the first body; and
a first selector mechanism arranged to selectively lock the first body for rotation with the first shaft,
wherein first selector mechanism is arranged to selectively lock the first body for rotation with the first shaft from operational modes that include the following modes:
fully engaged in both torque directions;
disengaged in both torque directions;
engaged in the forward torque direction while disengaged in the reverse torque direction; and
disengaged in the forward torque direction while engaged in the reverse torque direction.

34. A transmission system including:
a first shaft;
a first body rotatably mounted on the first shaft;
a first gear train having a first gear element rotatably mounted on the first body;
a second gear train having a second gear element mounted for rotation with the first body;
a first selector mechanism arranged to selectively lock the first body for rotation with the first shaft;
a second shaft; and
a second selector mechanism,
wherein the first gear train further includes a third gear element mounted on the second shaft in a manner such that it is arranged to rotate therewith, the second gear train further includes a fourth gear element rotatably mounted on the second shaft, the second selector mechanism is arranged to selectively lock the fourth gear element for rotation with the second shaft, and the first and second selector mechanisms are arranged to selectively transmit torque between the first and second shafts via the first and second gear trains; and
wherein the second selector mechanism further includes an actuator and engagement members formed or mounted on the third gear element, and the third gear element is arranged for axial movement along the second shaft.

35. A transmission system including a first shaft;
a first body rotatably mounted on the first shaft;
a first gear train having a first gear element rotatably mounted on the first body;
a second gear train having a second gear element mounted on the first body in a manner such that it rotates with the first body;
a first selector mechanism arranged to selectively lock the first body for rotation with the first shaft;
a second shaft;
a second selector mechanism;
wherein the first gear train further includes a third gear element mounted on the second shaft, the second gear train further includes a fourth gear element mounted on the second shaft, and the first and second selector mechanisms are arranged to selectively transmit torque between the first and second shafts via the first and second gear trains; and
further including a further selector mechanism arranged to selectively lock the first gear element for rotation with the first body, wherein the further selector mechanism includes an actuator and engagement members formed or mounted on the second gear element, and the second gear element is arranged for axial movement along the first body.

* * * * *